(12) United States Patent
El-Tahry et al.

(10) Patent No.: US 12,007,746 B2
(45) Date of Patent: Jun. 11, 2024

(54) METHODS AND SYSTEMS FOR ENABLING AND SCHEDULING 3D PRINTING-BASED FABRICATION

(71) Applicant: Strong Force VCN Portfolio 2019, LLC, Fort Lauderdale, FL (US)

(72) Inventors: Teymour El-Tahry, Detroit, MI (US); Charles Cella, Pembroke, MA (US)

(73) Assignee: STRONG FORCE VCN PORTFOLIO 2019, LLC, Fort Lauderdale, FL (US)

( * ) Notice: Subject to any disclaimer, the term of this patent is extended or adjusted under 35 U.S.C. 154(b) by 740 days.

(21) Appl. No.: 16/670,274

(22) Filed: Oct. 31, 2019

(65) Prior Publication Data

US 2020/0133235 A1    Apr. 30, 2020

Related U.S. Application Data

(63) Continuation of application No. PCT/US2018/039375, filed on Jun. 25, 2018.

(60) Provisional application No. 62/524,614, filed on Jun. 25, 2017.

(51) Int. Cl.
| | |
|---|---|
| G05B 19/4099 | (2006.01) |
| A23P 20/20 | (2016.01) |
| A23P 20/25 | (2016.01) |
| B29C 64/393 | (2017.01) |
| B33Y 50/02 | (2015.01) |
| G06Q 50/04 | (2012.01) |

(52) U.S. Cl.
CPC .......... *G05B 19/4099* (2013.01); *A23P 20/20* (2016.08); *B29C 64/393* (2017.08); *B33Y 50/02* (2014.12); *G06Q 50/04* (2013.01); *A23P 2020/253* (2016.08); *G05B 2219/49023* (2013.01)

(58) Field of Classification Search
CPC ...... G05B 19/4099; G05B 2219/49023; A23P 20/20; A23P 2020/253; B29C 64/393; B33Y 50/02; G06Q 50/04
See application file for complete search history.

(56) References Cited

U.S. PATENT DOCUMENTS

| | | | | |
|---|---|---|---|---|
| 9,533,526 | B1 * | 1/2017 | Nevins | .................. B33Y 99/00 |
| 2002/0147521 | A1 * | 10/2002 | Mok | .................. G05B 19/4099 |
| | | | | 700/118 |
| 2007/0073431 | A1 | 3/2007 | Roumeliotis et al. | |
| 2013/0290220 | A1 * | 10/2013 | Tschanz | .................. G06F 30/00 |
| | | | | 700/98 |

(Continued)

OTHER PUBLICATIONS

International Search Report and Written Opinion for International Application No. PCT/US2018/039375 dated Mar. 4, 2019 (7 pages).

*Primary Examiner* — Michael M. Robinson
(74) *Attorney, Agent, or Firm* — RMCK Law Group, PLC

(57) ABSTRACT

The present disclosure includes a three-dimensional design and integrated fabrication system that includes a data system in a computing environment. The system includes a manufacturing section including a pre-processing section and a post-processing section. The system also includes a material selection system and a control system that integrates the data system, manufacturing section, and material selection system with an intelligence system that includes artificial intelligence in the computing environment.

40 Claims, 26 Drawing Sheets

(56) References Cited

U.S. PATENT DOCUMENTS

2014/0034214 A1 2/2014 Boyer et al.
2015/0057784 A1 2/2015 Butler et al.
2016/0361878 A1* 12/2016 Gain .................... B29C 64/386
2017/0031635 A1* 2/2017 Pettis .................... G06F 3/1226

* cited by examiner

METHODS AND SYSTEMS FOR ENABLING AND SCHEDULING 3D PRINTING-BASED FABRICATION

CROSS-REFERENCE TO RELATED APPLICATION

This application is a continuation of International Application No. PCT/US2018/039375, filed Jun. 25, 2018, which claims the benefit of provisional application U.S. Patent Application No. 62/524,614, filed Jun. 25, 2017, both of which are hereby incorporated by reference in their entirety as if fully set forth herein.

FIELD

The present disclosure relates to three-dimensional (3D) printing based fabrication.

BACKGROUND 3D printing systems have become increasingly popular for rapid-prototyping and early manufacturing activities. 3D printing systems are typically independent of other systems while part of initial or experimental efforts but are not part of the larger manufacturing process. Applicant has identified a need to integrate the 3D manufacturing process into the larger manufacturing computing environment.

SUMMARY

According to some embodiments of the present disclosure, a three-dimensional (3D) printing system is disclosed. The 3D printing system includes a computer readable medium storing computer readable instructions and a processing system having one or more processors that execute the computer readable instructions. The computer readable instructions cause the processing system to receive a print job request corresponding to a requested print job, the print job request indicating an item to be 3D printed. The computer readable instructions cause the processing system to determine a plurality of print job attributes corresponding to the requested print job, including: determining a first amount of time to complete the requested print job, and determining a second amount of time until the item is to be delivered to a requestor. The computer readable instructions cause the processing system to determine a priority score of the requested print job based on the plurality of print job attributes and to order a 3D print job queue based on the priority score of the requested print job and other priority scores of one or more other print jobs stored in the 3D print job queue. The computer readable instructions cause the processing system to initiate a new 3D print job by a 3D printer of one or more 3D printers based on the 3D print job queue.

In embodiments, the 3D printing system further includes the one or more 3D printers. In embodiments, the one or more 3D printers print industrial items. In embodiments, the one or more 3D printers print food items. In embodiments, the one or more 3D printers print biomedical items. In embodiments, determining a priority score of the requested print job based on the plurality of print job attributes includes inputting the plurality of print job attributes to a scoring model, wherein the scoring model outputs a priority score of the requested print jobs based on the plurality of print job attributes. In embodiments, the priority score of the requested print job is determined based on a rules-based approach. In embodiments, the plurality of print job attributes includes a location of a requestor, and wherein: determining the second amount of time is based on the distance of the requestor from a location of the one or more 3D printers. In embodiments, the second amount of time is indicated by a requested pickup time received in the request. In embodiments, determining the first amount of time includes: retrieving a design record from a design library corresponding to the item to be 3D printed; determining a completion time of the item to be 3D printed from the design record; and determining the first amount of time based on the completion time. In embodiments, the completion time indicates an amount of time needed to 3D print the item. In embodiments, the completion time indicates an amount of time needed to pre-process the requested print job, 3D print the item, and post-process the item. In embodiments, determining the first amount of time includes: receiving a 3D model of the item to be printed; estimating a completion time based on the model; and determining the first amount of time based on the completion time. In embodiments, the print job attributes of the requested print job include a loyalty attribute corresponding to a requestor of the print job. In embodiments, the print job attributes of the requested print job include a price attribute indicating a price paid to have the item 3D printed.

According to some embodiments of the present disclosure, a method for controlling a three-dimensional (3D) printing system is disclosed. The method includes receiving, by a processing system having one or more processors, a print job request corresponding to a requested print job, the print job request indicating an item to be 3D printed. The method further includes determining, by the processing system, a plurality of print job attributes corresponding to the requested print job, including: determining a first amount of time to complete the requested print job; and determining a second amount of time until the item is to be delivered to a requestor. The method further includes determining, by the processing system, a priority score of the requested print job based on the plurality of print job attributes. The method further includes ordering, by the processing system, a 3D print job queue based on the priority score of the requested print job and other priority scores of one or more other print jobs stored in the 3D print job queue. The method further includes initiating, by the processing system, a new 3D print job by a 3D printer of one or more 3D printers based on the 3D print job queue.

In embodiments, the one or more 3D printers print industrial items. In embodiments, the one or more 3D printers print food items. In embodiments, the one or more 3D printers print biomedical items. In embodiments, determining a priority score of the requested print job based on the plurality of print job attributes includes inputting the plurality of print job attributes to a scoring model, wherein the scoring model outputs a priority score of the requested print jobs based on the plurality of print job attributes. In embodiments, the priority score of the requested print job is determined based on a rules-based approach. In embodiments, the plurality of print job attributes includes a location of a requestor, and wherein: determining the second amount of time is based on the distance of the requestor from a location of the one or more 3D printers. In embodiments, the second amount of time is indicated by a requested pickup time received in the request. In embodiments, determining the first amount of time includes: retrieving a design record from a design library corresponding to the item to be 3D printed; determining a completion time of the item to be 3D printed from the design record; and determining the first amount of time based on the completion time. In embodiments, the completion time indicates an amount of time needed to 3D print the item. In embodiments, the completion time indicates an amount of time needed to pre-process the requested print job, 3D print the item, and post-process the item. In embodiments, determining the first amount of time includes: receiving a 3D model of the item to be printed; estimating a completion time based on the model; and determining the first amount of time based on the completion time. In embodiments, the print job attributes of the requested print job include a loyalty attribute corresponding to a requestor of the print job. In embodiments, the print job attributes of the requested print job include a price attribute indicating a price paid to have the item 3D printed.

In some embodiments of the present disclosure, a 3D printing system is disclosed. The 3D printing system includes a data system in a computing environment. The system includes a manufacturing section including a pre-processing section and a post-processing section. The system also includes a material selection system and a control system that integrates the data system, a manufacturing section, and a material selection system with an intelligence system that includes artificial intelligence in the computing environment.

In embodiments, the manufacturing section is configured to print shape memory-based devices. In embodiments, the manufacturing section is configured to print a personalized food item. In embodiments, the manufacturing section is configured to print bioactive materials. In embodiments, the manufacturing section is configured to print bioactive coatings. In embodiments, the manufacturing section is configured to print shape memory devices. In embodiments, the manufacturing section is configured to print a flexible circuit. In embodiments, the manufacturing section is configured to control an amount of material delivered to the printer that is adjustable based on the excess material detected by a sensor. In embodiments, the system includes a lighting system connected to the computing environment. In embodiments, the system includes an automatic robotic handling system connected to the computing environment. In embodiments, the system includes a physical modeling suite and an economic modeling suite connected to the computing environment.

DETAILED DESCRIPTION

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

Figure 1:
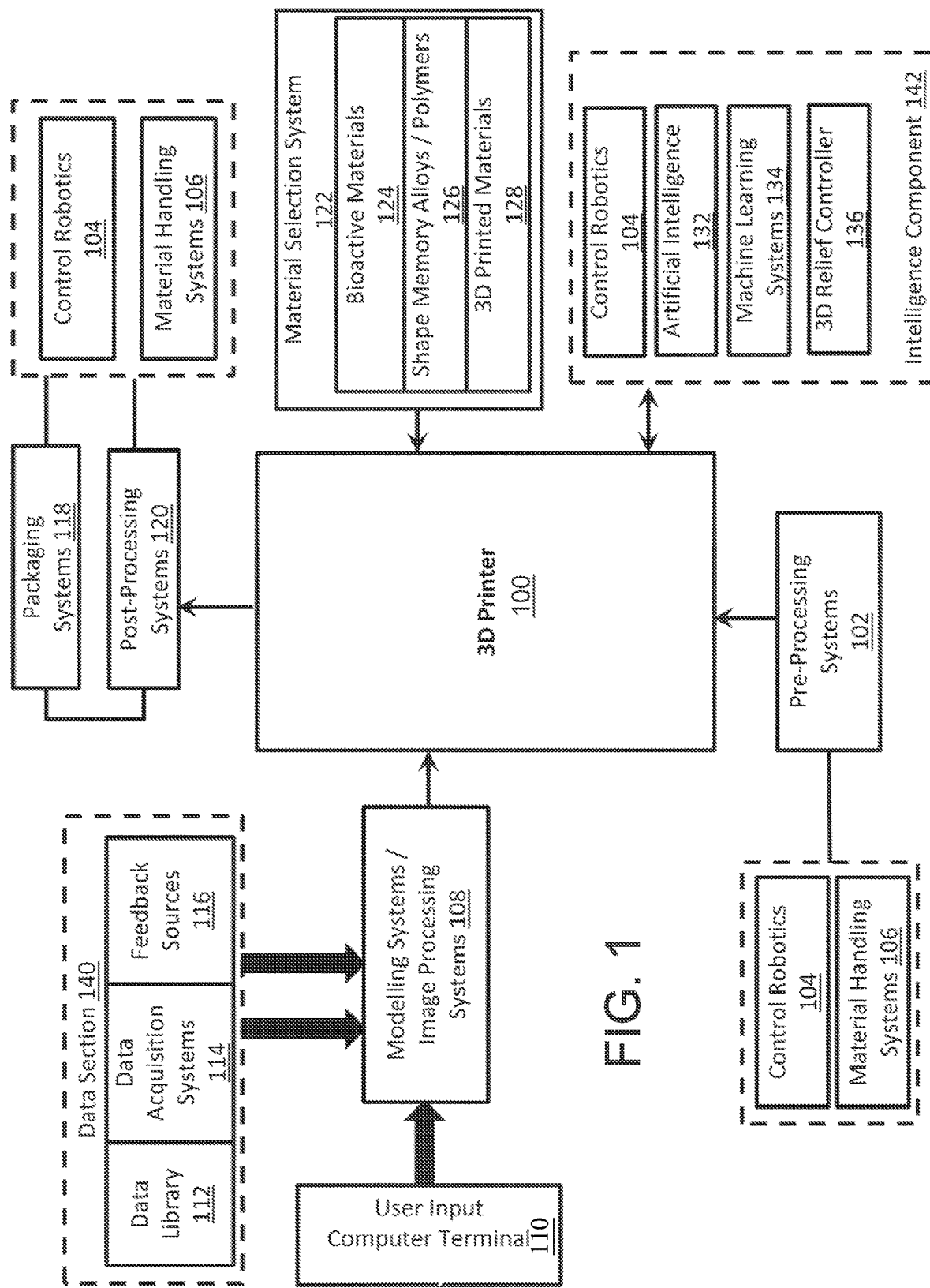
FIG. 1 is a diagrammatic view of an exemplary architecture for a platform for enabling 3D printing-based fabrication in accordance with embodiments of the present disclosure.
Figure 3:
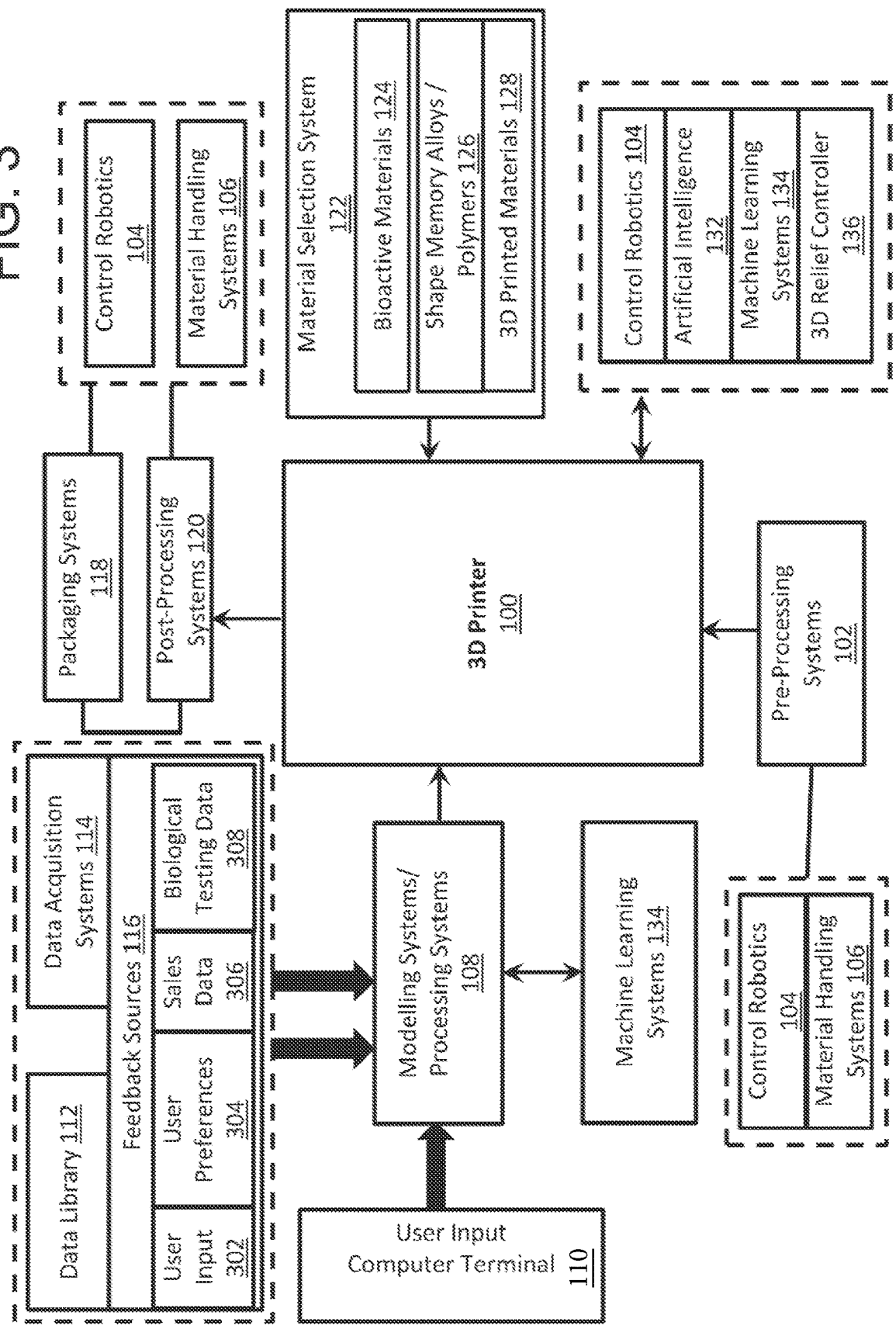
FIG. 3 is a diagrammatic view of an exemplary specialized, transformable electronic data structure representing a 3D printed physical article that optionally results from pre-processing, handling, 3D printing, post-processing and/or packaging in accordance with embodiments of the present disclosure.

FIG. 1 illustrates an example of a 3D design and printing environment (or "printing environment" or "3D printing environment") constituting a plurality of integrated fabrication systems, in accordance with an embodiment of the invention. In an example, the printing environment includes a 3D printing ecosystem operating within a conventional manufacturing ecosystem, among other systems without limitations. In embodiments, the 3D printing ecosystem may include a data section 140, central modeling systems and/or image processing systems 108, a 3D printer 100, and a computer terminal (or user input terminal) 110. The data section 140 may further include without limitations a data library 112, data acquisition systems 114, and feedback sources 116. Feedback sources 116 may include sales data 306, biological testing data 308, and the like (as shown in FIG. 3). An intelligence component 142 may be further coupled to or included in the 3D printing ecosystem 506. The intelligent unit 142 may include control robotics 104, artificial intelligence systems 132, machine learning systems 134, a 3D relief controller 136, and the like. The 3D printing ecosystem 506 may further include or be coupled to a material selection system 122. The material selection system 122 may select materials from a group of material types such as without limitations bioactive materials 124, shape memory alloys (or shape memory polymers) 126, and 3D printed materials 128 without limitations. It is noted that different systems may employ different sets of materials, from which the material selection system 122 may select from. These materials are discussed further later.

The conventional manufacturing ecosystem may include for example pre-processing systems 102, post-processing systems 122, packaging systems 118, control robotics 104 and material handling systems 106. The material handling systems 106 and control robotics 104 may be included or coupled to each of the pre-processing systems 102, post-processing systems 122, and packaging systems 118. In one example, the conventional manufacturing system may also be coupled to the material selection system 122, though not shown in FIG. 1.

The 3D printing ecosystem 506 utilizes 3D printing and modeling techniques for performing various manufacturing activities to provide several advantages. For example, the present disclosure involving the use of the 3D printing ecosystem 506 may facilitate prototype part production or replacement part production of limited quantities. In another example, the present invention involving the use of the 3D printing ecosystem 506 facilitates making parts of complex configurations unobtainable by conventional fabrication methods. Further, the 3D printing ecosystem 506 eliminates tool wear. Further, the 3D printing ecosystem 506 may be coupled to a CAD/CAM environment such that a large number of parts can be programmed into a computer and can be easily produced with little human intervention. In embodiments, fundamental way of performing manufacturing activities in the 3D printing ecosystem 506 employs building up of a part or a component in a layer-by-layer manner through an additive process. The part is considered a plurality of discrete cross-sectional regions which together comprise a 3D configuration of the part. Each discrete cross-sectional region has defined boundaries. Several methods may be employed for additive layering of the material for fabrication of the part, as will be described later.

In embodiments, the 3D printer 100 contained in the 3D printing ecosystem 506 may be an industrial robot for executing additive manufacturing operations using a variety of 3D printing techniques, as discussed below. In embodiments, the 3D printer 100 builds a part layer-by-layer. Therefore, the entire process of additive manufacturing may be termed as 3D printing or rapid prototyping interchangeably hereafter. The resolution and accuracy levels of the 3D printer 100 may be defined based on the manufacturing requirements in various embodiments of the invention.

In embodiments, the 3D printer 100 may include various modules and structural components and may be configured to a specific architecture in order to execute one or more of the various 3D printing methods, as discussed herein.

In embodiments, the 3D printer 100 may be configured to execute a sintering process for increased durability and hardness.

The 3D printer 100 may be any suitable type of 3D printer 100 that executes any suitable type of 3D printing process. Various different types of 3D printers 100 and 3D printing processes are discussed below for purposes of example. The disclosure, however, is not limited to the 3D printing processes described below.

In embodiments, the 3D printer 100 may be configured to execute Fused Deposition Modeling (FDM)™ process (also known as, for example, Fused Filament Fabrication™). The process of FDM may involve a software process which may process an STL (stereolithography) file. An object may be produced by extruding small beads of, for example, thermoplastic material to form layers as the material hardens immediately after extrusion from a nozzle. Extrusion is the 3D printing technique where the material, typically a polymer although metal extrusion is being developed, is pushed through a tube and into a moving nozzle which extrudes the material and the material subsequently hardens in place. By accurately moving the extruder either continuously or starting and stopping at extremely fast speeds the design is built layer by layer. A plastic filament or metal wire is unwound from a coil and supplies material to an extrusion nozzle which can turn the flow on and off. A worm-drive, or any other suitable drive system, may be provided to push the filament into the nozzle at a controlled rate. The nozzle is heated to melt the material. The thermoplastics are heated past their glass transition temperature and are then deposited by an extrusion head. The nozzle can be moved in both horizontal and vertical directions by a numerically controlled mechanism. In embodiments, the nozzle may follow a tool-path controlled by a computer-aided manufacturing (CAM) software package, and the object is fabricated from the bottom up, one layer at a time.

In embodiments, the 3D printer 100 may be configured to execute electron beam freeform fabrication processes. The Electron Beam Freeform Fabrication (EBFFF) process may utilize electron beam welding technology to create metallic parts. In embodiments, with the EBFFF method, metallic preforms can be manufactured from computer-generated 3D drawings or models. The deposition path and process parameters may be generated from post-processing of a virtual 3D model and executed by a real-time computer control. The deposition takes place in a vacuum environment. A wire may be directed toward the molten pool and melted by a focused EB. Different parts of the object to be fabricated are built up layer by layer by moving the EB and wire source across a surface of underlying material referred to as a substrate. The deposit solidifies immediately after the electron beam has passed.

In embodiments, the 3D printer 100 may be configured to execute direct metal laser sintering process (DMLS). DMLS process may involve a laser as a power source to sinter powdered material such as a metal at points in space defined by a 3D model thus binding the material together to create a solid structure. The DMLS process may involve the use of a 3D CAD model whereby an .stl file is created and sent to the software of the 3D printer 100. The DMLS-based 3D printer 100 uses a high-powered fiber optic laser. The metal powder is fused into a solid part by melting it locally using the focused laser beam. Object parts are built up additively layer by layer.

In embodiments, the 3D printer 100 may be configured to execute selective laser melting (SLM) process. The SLM process uses 3D CAD data as a digital information source and energy in the form of a high-power laser beam to create 3D metal parts by fusing fine metallic powders together. The process involves slicing of the 3D CAD file data into layers to create a 2D image of each layer. Thin layers of atomized fine metal powder are evenly distributed using a coating mechanism onto a substrate plate that is fastened to an indexing table that moves in the vertical (Z) axis. This takes place inside a chamber containing a tightly controlled atmosphere of inert gas such as argon. Once each layer has been distributed, each 2D slice of the geometry is fused by selectively applying the laser energy to the powder surface, by directing the focused laser beam using two high frequency scanning mirrors in the X- and Y-axes. The laser energy permits full melting of the particles to form solid metal. The process is repeated layer after layer until the part is complete.

In embodiments, the 3D printer 100 may be configured to execute selective heat sintering process. The process may involve a thermal printhead to apply heat to layers of powdered thermoplastic. When a layer is finished, the powder bed of thermoplastic moves down, and an automated roller adds a new layer of material which is sintered to form a next cross-section of the object. Power bed printing may refer to a technique where one or more powders, typically a metal powder, are connected via various methods such as lasers or heat in order to rapidly produce the end product. Typically, it is done by either having an area filled with powder and only connecting the design areas of the powder while layer by layer removing the rest, or by adding powder layer-by-layer while simultaneously connecting it. Similar to light polymerization, powder bed printing is significantly faster than other types of 3D printing; there are, however, a limited selection of metal powders that suitable for such printing.

In embodiments, the 3D printer 100 may be configured to execute a selective laser sintering process. The process of selective laser sintering (SLS) involves a laser used to melt a flame-retardant plastic powder, which then solidifies to form the printed layer. In embodiments, the 3D printer 100 may be configured to execute a plaster-based 3D printing processes. In embodiments, the 3D printer 100 may be configured to execute a laminated object manufacturing process. In this process, layers of adhesive-coated paper, plastic, or metal laminates may be successively glued together and cut to shape with a knife or laser cutter. After the object is fabricated by the 3D printer 100, additional modifications may be done by machining or drilling after printing.

In embodiments, the 3D printer 100 may be configured to execute stereo-lithography (SLA) processes. The process may employ a vat of liquid ultraviolet curable photopolymer "resin" and an ultraviolet laser to build layers one at a time. For each layer, the laser beam traces a cross-section of the part pattern on the surface of the liquid resin. Exposure to the ultraviolet laser light cures and solidifies the pattern traced on the resin and joins it to the layer below.

In embodiments, the 3D printer 100 may be configured to execute digital light processing (DLP) methods. Digital Light Processing uses a projector to project an image of a cross-section of an object into a vat of photopolymer (light reactive plastic). The light selectively hardens only the area specified in that image. A printed layer is then repositioned to leave room for unhardened photopolymer to fill newly created space between the print and the projector. Repeating this process builds up the object one layer at a time.

In embodiments, the 3D printer 100 may be configured to execute light polymerization methods. In this process, drops of a liquid plastic are exposed to a laser beam of ultraviolet light. During this exposure, light converts the liquid into a solid. Light polymerization may refer to a technique where a rising or falling layer of light-sensitive polymer is subjected to the type of light which causes it to harden in changing areas over time as it rises or falls. This causes these areas of the polymer to harden and once the entire shape is created all of the polymer that did not harden is removed leaving the finished product. Light polymerization is useful because of how fast the final product completes with some types working up to a hundred times faster than other 3D printing methods for some designs.

In embodiments, the 3D printer 100 may involve the use of an inkjet type printhead to deliver a liquid or colloidal binder material to layers of a powdered build material. The printing technique may involve applying a layer of a powdered build material to a surface such as using a roller. After the build material is applied to the surface, the printhead delivers the liquid binder to predetermined areas of the layer of material. The binder infiltrates the material and reacts with the powder, causing the layer to solidify in the printed areas by, for example, activating an adhesive in the powder. After the first cross-sectional portion is formed, the steps are repeated, and successive cross-sectional portions are fabricated until the final object 502 is formed.

In embodiments, the methods performed by the 3D printer 100 may involve deposition of successive layers of a build material on a rotary build table and deposition of a liquid in a predetermined pattern on each successive layer of the build material to form a 3D object.

In embodiments, the 3D printer 100 may be coupled to a material delivery system (not shown). The material delivery system may include a storage mechanism that holds the material and a conveying mechanism that delivers the build material to the 3D printer 100. The storage mechanism may further include several storage chambers for holding different material components separate from each other and the system may further include a blender that mixes the material components in a predetermined ratio for delivery to the 3D printer 100.

Figure 15:
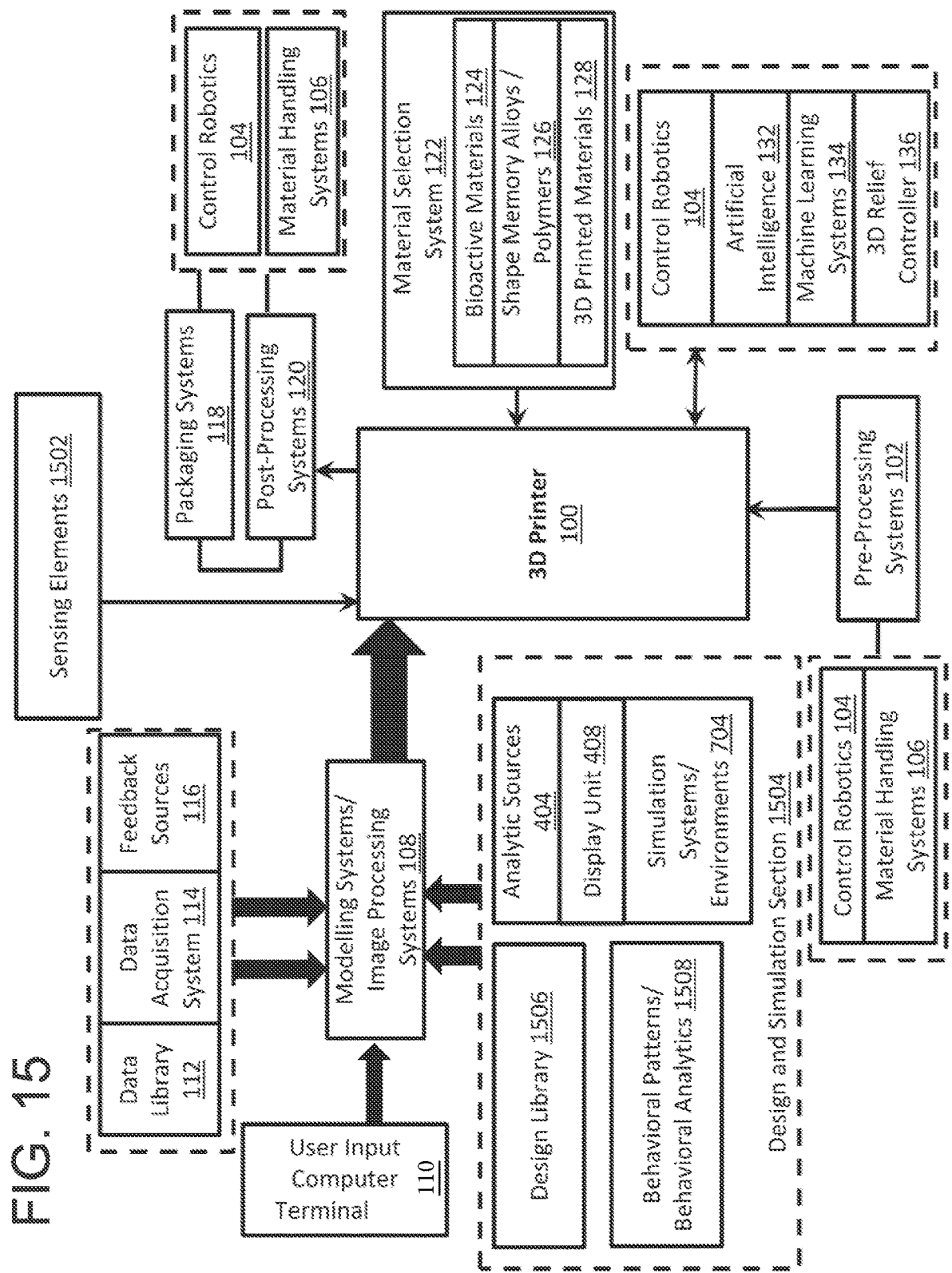
FIG. 15 is a diagrammatic view of an exemplary amount of material delivered to the printer that may be adjusted based on the excess material detected by the sensor (or sensing element) in accordance with embodiments of the present disclosure.

In embodiments, the 3D printer 100 is further coupled to one or more sensing elements 1502 that are configured to detect an amount of access material delivered to the 3D printer 100. In embodiments, the sensing element includes one or more sensors that sense an amount of material delivered to the 3D printer 100. The sensors may be mechanical, electrical, and/or optical sensors. The amount of material delivered to the printer may be adjusted based on the excess material detected by the sensing element 1502, as illustrated in FIG. 15. In embodiments, the sensing element 1502 can automatically monitor printhead position and accordingly the material delivery system can adjust the delivery of the material to the 3D printer 100. For example, in response to determining that the access amount of material has been delivered to the 3D printer 100, the materials selection system 122 may adjust an amount of material delivered to the 3D printer in a following print job of the same type (e.g., the same type of object). In embodiments, the sensing element 1502 (or a module in communication therewith) may reference an elements design library 1506 that includes information relating to different objects, including materials to be used to print an object, amounts of materials to be used to print an object, an order at which different materials are applied, CAD designs to print an object, and the like. In embodiments, the elements design library 1506 may define the amount of materials to be used and an expected amount of excess materials in a print job of a particular type of object. In these embodiments, the sensing element may reference the design library 1506 In embodiments, the design and simulation section 1504 may further include sensing behavioral patterns and sensing behavioral analytics 1508, which may include analytics data corresponding to previous print jobs (which may be collected from analytics sources (which may include the sensing element 1502 and/or feedback sources 116).

In embodiments, the 3D printer 100 may further include an opening for removal of the 3D printed object. In embodiments, the 3D printer 100 can include arrangements for cleaning the 3D printer 100 after manufacturing of the object is complete.

In embodiments, the 3D printer 100 may use several types of materials for performing 3D printing operations using one or more of the various technologies and methods discussed above. The material selection system 122 may determine and select the types and amounts of materials required for performing specific processes and fabrication of specific objects. The selected materials are used for 3D printing by the 3D printer 100 in association with various methods and processes such as those discussed above. In an example, the 3D printed materials 128 may include, but not limited to, thermoplastics, eutectic metals, edible materials, rubber, modeling clay, porcelain, metal clay, metal alloy, wax, thermoplastic powder, metal powders, ceramic powders, paper, plastic film, metal foil, photopolymer, bio-compatible photopolymers (for surgical and dental applications), filament materials for 3D printing to imitate wood, and any other custom developed materials for the purpose of 3D printing-based fabrication processes. It is noted that depending on the application of the 3D printing-based fabrication process, the 3D printed materials may vary. For example, a 3D printing-based fabrication process of food items may use various edible materials, while a 3D printing-based fabrication process of vehicle parts may include metal alloys, thermoplastics, metal foils, photopolymers, and the like.

The 3D printer 100 may be coupled to the modeling system 108 (or image processing systems). In embodiments, the modeling system 108 may be configured to create a 3D model of an object. The 3D model may be created using, for example, a CAD (computer aided design) software. The software may provide directions toward the structural integrity of an expected finished product using scientific, theoretical, modeling, simulation, structural or materials related data or other types of externally input data to create virtual simulations of how the object will behave under certain defined conditions.

In embodiments, the modeling system 108 may be further configured to convert the CAD model or CAD drawing into a 3D printer 100 recognizable file such as a .stl file or STL (standard tessellation language) file. The 3D printer 100 may recognize the STL file developed by the modeling system 108 and may also use other support files for performing 3D printing methods. The STL file may be transferred to the 3D printer 100 or to a computer connected communicatively with the 3D printer 100 by a user or by the modeling system 108 automatically. The user or computer may subsequently designate size and orientation for printing by the 3D printer 100, which is communicatively coupled to the modeling system 108.

In embodiments, the modeling system 108 may develop a mathematical representation of a 3D surface of an object to be printed with the use of modeling software. The modeling software may also include 3D graphics software for allowing displaying and representation of the 3D models generated by the modeling system 108 in the form of visuals or graphics. In an example, the 3D model, thus generated, may be represented using a collection of points in 3D space, connected by various geometric entities such as lines, triangles, rectangles, and the like. In an example, the 3D modeling system 108 may be coupled to or may include a 3D scanner that scans 3D images to be converted into models by the modeling system. In various aspects of the invention, the modeling system 108 may be configured to generate solid images or models and shell or boundary models.

Figure 20:
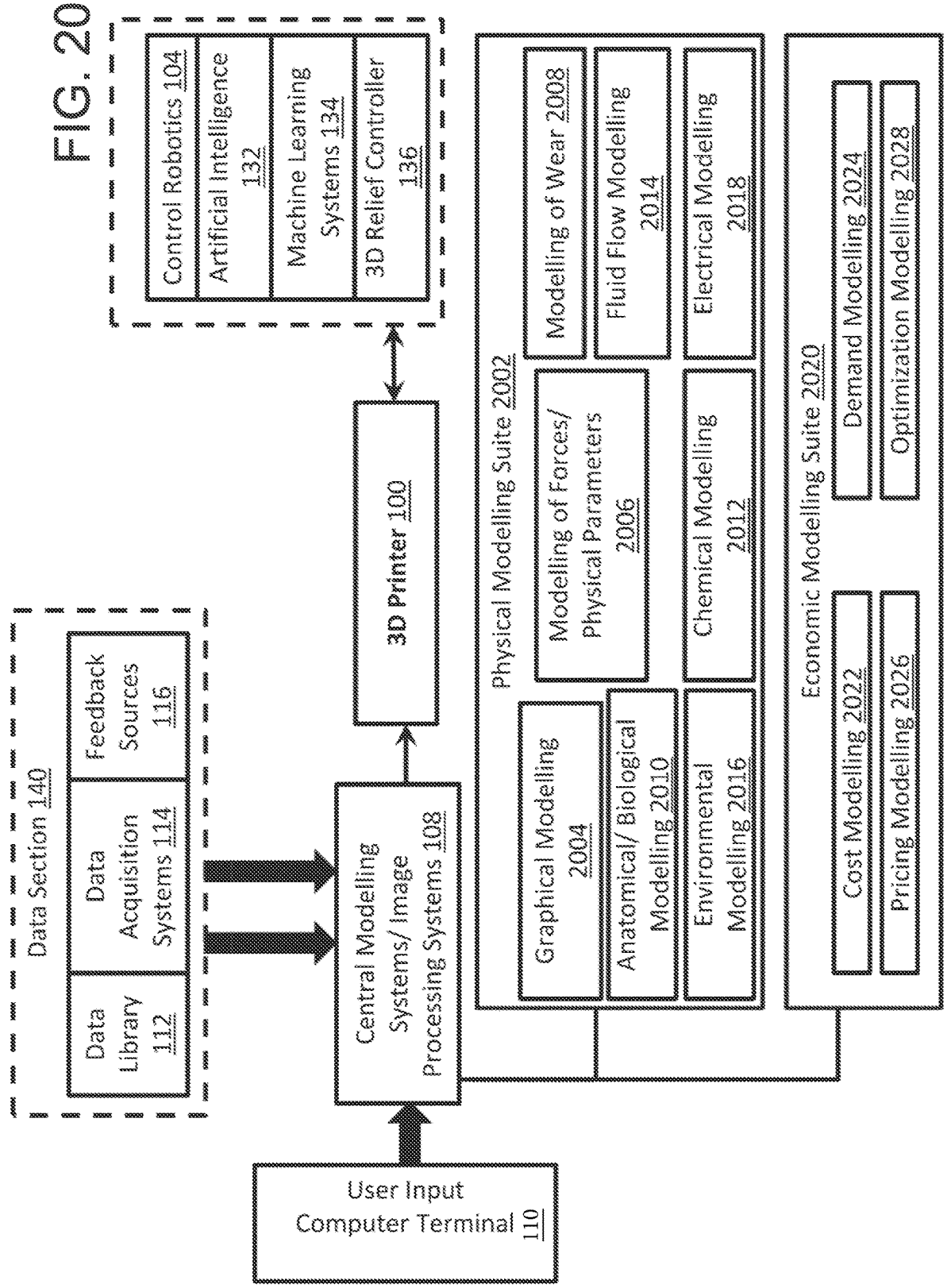
FIG. 20 is a diagrammatic view of an exemplary 3D printer ecosystem including a physical modeling suite and economic modeling suite in accordance with embodiments of the present disclosure.
Figure 21:
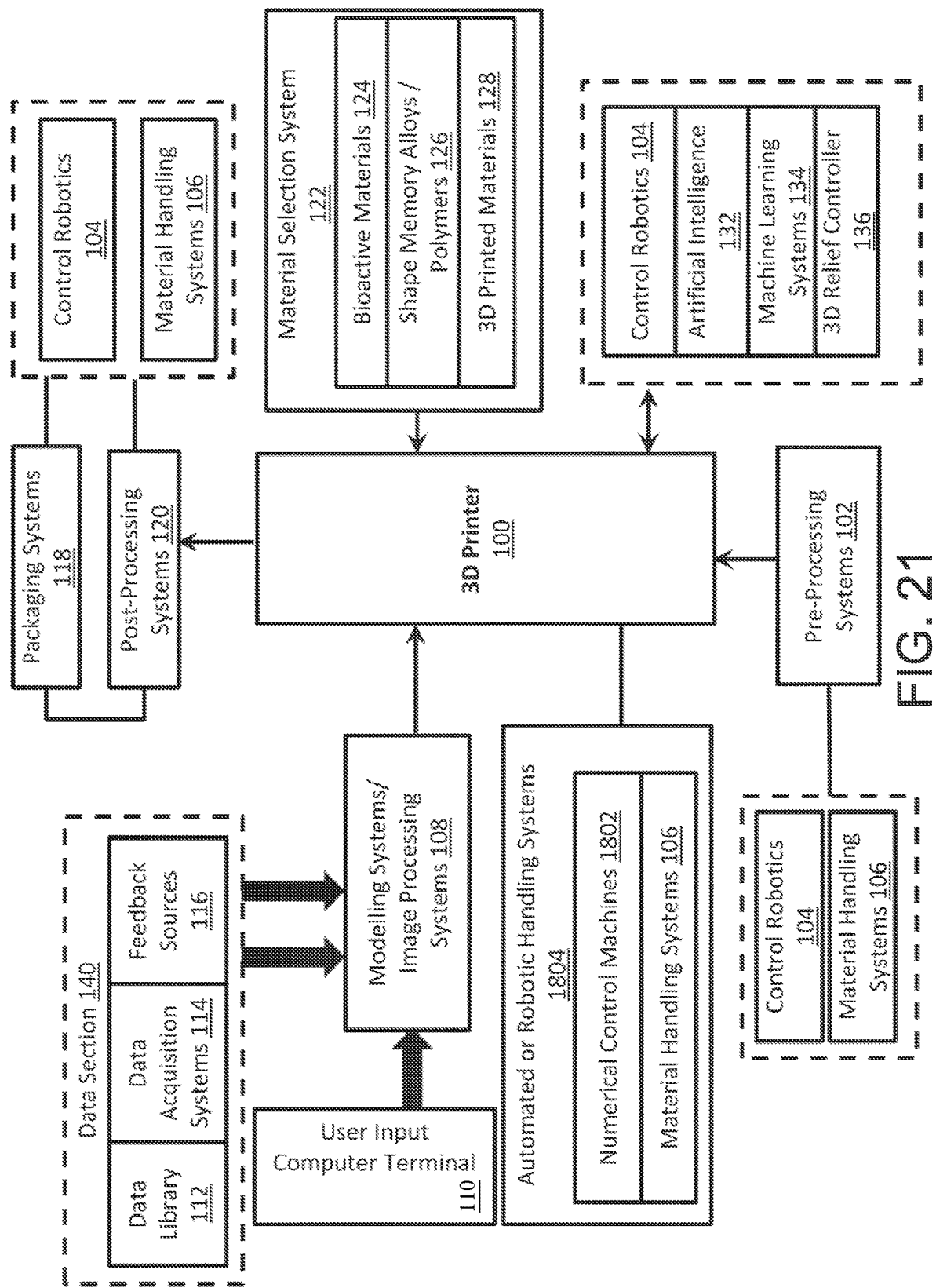
FIG. 21 is a diagrammatic view of an exemplary 3D printer ecosystem including control robotics assisting or controlling material selection, pre-processing, post-processing and handling and packaging in accordance with embodiments of the present disclosure.

In embodiments, the modeling system 108 may be configured for digital sculpting. In embodiments, the modeling system 108 may be configured for curve modeling. In embodiments, the modeling system 108 may be configured for interactive representation of anatomy and medical (or biological) modeling 2010 (for example for use in surgical planning 3D surgical modeling), and the like. In embodiments, the modeling system 108 may be configured to combine image or video or sensor data with models. In embodiments, the modeling system 108 may be configured to generate graph-based models. In embodiments, the modeling system 108 may be configured to perform physical parameter (or forces) modeling 2006, as illustrated in FIG. 20. In embodiments, the modeling system 108 may be configured for anatomy and medical (or biological) modeling 2010. Other types of modeling may include chemical modeling 2012, environmental modeling 2016, and the like. In embodiments, the modeling system 108 may be configured for doing environmental parameter modeling. In embodiments, the modeling system 108 may be configured for modeling of weights and loads. In embodiments, the modeling system 108 may be configured for modeling of chemical interactions. In embodiments, the modeling system 108 may be configured for modeling of wear 2008. In embodiments, the modeling system 108 may be configured for fluid flow modeling 2014. In embodiments, the modeling system 108 may be configured for electrical (or electrical circuit) modeling 2018. In embodiments, the modeling system 108 may be configured for project modeling. For example, the modeling system 108 may utilize or generate Gantt charts or dependency charts and the like. In embodiments, the modeling system 108 may be configured for economic modeling. Economic modeling may be performed by an economic modeling suite 2020. For example, the modeling system 108 may be configured for pricing modeling 2026, demand modeling 2024, cost modeling 2022, optimization modeling 2028, and the like without limitations. In embodiments, the modeling system 108 may be configured to employ additional or alternative types of modeling.

As mentioned above the 3D printing ecosystem 506 may include a data section 140. In embodiments, the data section 140 may facilitate generating, providing, manipulating, and/or organizing data or information to be used by the modeling system 108 or various other systems of the 3D printing ecosystem (e.g., the machine learning systems 134 and/or artificial intelligence systems 132). In embodiments, the data section 140 may be linked to or may include a plurality of data sources, such as shown in the FIG. 1, without limitations. These data sources shown in FIG. 1 may include a data library 112, data acquisition system 114, and feedback sources 116. In embodiments, the data sources may further include the sensing elements 1502 of the printing environment. Other similar or different data sources may also be linked with the 3D printing ecosystem 506. In an aspect of the present invention, the data sources may be provided within an ecosystem facility. In another aspect, the data sources may be located at a remote location. In an aspect of the present invention, the data sources may be communicatively networked with the system through a wired or a wireless network or through a combination of both wired and wireless network.

The data acquisition system 114 may be a computing system including one or more computing devices that collect data from one or more data sources. In embodiments, the data acquisition system 114 may acquire a sonar or ultrasound system, laser-based imager, CT scanning devices, 3D scanners, X ray machine, PET scans, radar, IR inspection system, ECG machine, and the like without limitations. In embodiments, the data acquisition system 114 may acquire health record data. In embodiments, the data acquisition system 114 may include a library of patient imaging data or a library of real world imaging data. In embodiments, the data acquisition system 114 may retrieve data from data models. In embodiments, the data acquisition system 114 may collect health record data. The acquisition of health record data may ensure to meet privacy or identity guidelines as prescribed by government regulations. For example, the health record data may be gathered from electronic health record banks and the like. In embodiments, the data acquisition system 114 may include systems for recording pacemaker data or data from other implantable or non-implantable medical devices. In embodiments, the data acquisition system 114 may, for example, include glucose monitoring devices.

In embodiments, the data acquisition system 114 may be coupled to medical testing devices for gathering data related to medical or biological testing 308. Medical testing may comprise genetic testing such as without limitations diagnostic testing, carrier testing, pre-implantation genetic diagnosis, newborn screening, prenatal diagnosis, predictive and pre-symptomatic testing, pharmacogenomics, forensic testing, parental testing, genealogical DNA testing and the like. In embodiments, the data acquisition system 114 may be coupled to medical testing devices used for several genetic diseases involving the use of genetic testing components. Few examples of these diseases without limitations are factor VIII, over-absorption of iron, alpha-1 antitrypsin deficiency, beta-thalassemia, Factor II, Factor V Leiden, Homocysteine, PAI-1 gene mutation, Crohn's Disease, Cystic Fibrosis, Familial hypercholesterolemia, Fanconi anemia, Fragile-X Syndrome, Friedreich's ataxia, Huntington Disease, Myotonic muscular dystrophy, Pseudocholinesterase deficiency, Tay-Sachs Disease, Variegate porphyria. In various aspects of the present invention, the data gathered for these and other diseases may be utilized by the modeling systems or other system in the 3D ecosystem for a variety of purposes such as for modeling the objects, and/or developing or printing implantable, non-implantable, or testing devices for the treatment of these and various other respective diseases with the use of the 3D printer 100.

In an aspect of the present invention, medical testing data gathered by the data acquisition system 114 may comprise data from blood analysis such as without limitations testing of Lipid profile, testing of Vitamin, testing of vitamin types, testing of minerals, analysis of presence of disease factors, determination of K factor (sodium/potassium ratios), determination of TSH levels, testing of Glucose, Glucose Tolerance Testing, Cholesterol analysis, Molecular profiles analysis, Cellular evaluation analysis, Luminol analysis, Schumm test, Peripheral blood smear analysis, Blood enzyme analysis, Complete blood count (CBC) analysis, Kidney Function analysis, Protein analysis, Creatine Kinase analysis, Lipoprotein panel analysis, Coagulation Panel (Blood Clotting Tests), and the like.

As depicted in FIG. 1, a data section 140 may further include the feedback sources 116 for facilitating input of feedback information into the modeling system 108 or the 3D printer 100 by a user mechanically or through automated computer-controlled feedback devices. In embodiments, the feedback sources 116 serve as custom-centric information gathering systems for modeling of objects by the modeling system 108 so as to ensure adherence to defined parameters and standards during printing. In embodiments, the information gathered from the feedback sources 116 may be utilized by the modeling system 108 or other systems within the 3D ecosystem to improve the representation of a user's needs. In an aspect of the present invention, the feedback sources 116 may include direct input of information by a user. In another aspect, the feedback sources 116 may include surveys, experimentations, focus group interviews, and the like. In an aspect of the present invention, the feedback sources 116 may include shopping behavior, purchasing behavior, financial data, health related data or any other types of data. For example, the feedback may include information pertinent to health standards so as to meet health regulations while modeling and printing a healthcare related object. In an example, the feedback sources 116 may track success while maintaining HIPAA compliance. In an aspect of the present invention, the feedback sources 116 may track data pertinent to product success. In embodiments, the feedback sources 116 may be communicatively coupled to sensor 1502 for monitoring events and record information to be used by the feedback sources 116 for improvement of user needs representation during modeling and printing.

In an embodiment of the present invention, a data section 140 may further include the data library 112, as illustrated in FIG. 20. A data library 112 may serve as a database for storing data pertinent to 3D printing, objects modeling, or for any other purpose needed in the 3D ecosystem. A data library 112 may, for example, store data obtained by the feedback sources 116, data acquisition system 114, or user input data 302. A data library 112 may also store simulation and behavioral data for providing simulation environments and for facilitating behavioral analysis of models under different conditions and parameters of stress, strain, load, heat, force, pressure, vacuum, moisture, chemical reactions, physical reactions, and the like prior to actual printing of the object by the 3D printer 100. In various aspects of the invention, a data library 112 may store a collection of numeric, audio, visual, textual, and graphical data.

In an embodiment of the present invention, the data stored by the data library 112 may include, for example, enterprise data maintained in an enterprise database, wherein the enterprise database may be communicatively connected with the data library 112. In embodiments, the data may be maintained over a peer-to-peer network either through local or distributed systems. In embodiments, the data may be maintained over cloud architectures for example through private clouds or public clouds or hybrid clouds. Various privacy and security measures may be taken to protect the data stored in the data library 112 through encryption and other techniques. In embodiments, the data library 112 may also store metadata associated with the stored data and also associate necessary tagging with the metadata. In embodiments, the data library 112 may be connected with publishing systems for feedback and other purposes. Several technologies for integration of data may be adopted including without limitations ETL to transform to a useable format for the 3D printing environment, searchable interfaces for allowing natural language-based searching capabilities, and the like. In embodiments, simulations and models may be stored as libraries in the data library 112 as cloud or as services available in a service-oriented architecture. Libraries in the data library 112 may include, for example, fluid mechanics libraries and laminar flow element design libraries 1206, and the like.

Figure 5:
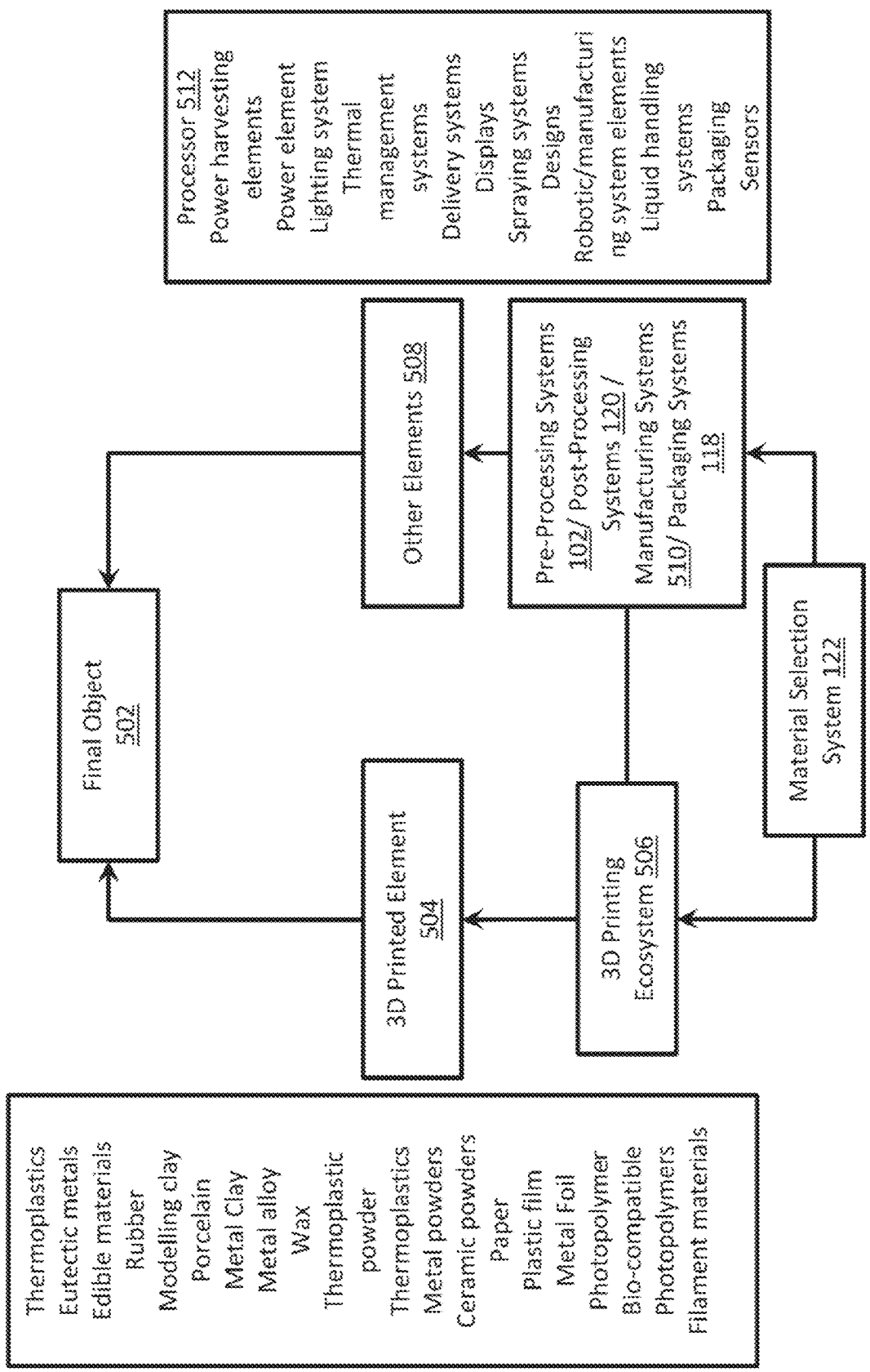
FIG. 5 is a diagrammatic view of an exemplary process flow for pre-processing, handling, 3D printing, post-processing and/or packaging a 3D printed article, involving a series of optional transformations of the physical article from an original material state to a final physical article in accordance with embodiments of the present disclosure.

In embodiments, the printing environment may include the conventional manufacturing ecosystem, as shown in FIG. 5. The conventional manufacturing ecosystem may be provided in the proximity of the 3D printing ecosystem 506 so as to allow a wide range of other processing, pre-processing or post-processing activities in conjunction with the 3D printing. In embodiments, the conventional manufacturing ecosystem may include a pre-processing system and a post processing system (together hereafter referred to as processing systems for simplicity of the description).

The processing systems 512, for example, may be used for cooking or heating of 3D printing objects before or after the process of 3D printing. For example, heat beds may be provided in the vicinity of the 3D printer 100 to facilitate heating operations. The processing systems 512 may include crystal growth systems such as for sapphire crystal growth and the like over 3D printed objects. The processing systems 512 may further include one or more of sintering systems, chemical vapor deposition systems, devices for stereolithography, semiconductor layering devices such as for epitaxial growth, devices for spraying or coating, devices for chemical mechanical polishing or planarization, devices for roll cutting or painting, etching systems, equipment for machining or grinding such as grinders, lathe machine, milling machine and the like, laser cutting devices, and the like. For example, the laser cutting devices may involve high power lasers. The processing systems 512 may further include sterilization systems for disinfecting 3D printed objects such as medical devices, implantable devices, surgical devices, syringes, needles, and the like. The sterilization systems may involve radiation, heat, or biocides for sterilizing the objects. The processing systems 512 may further include systems for performing physical vapor deposition, devices for performing drying processes involving for example heat beds, or evaporators etc., pre-processing simulation systems that provide physical simulation environments, devices for hot iso-static pressing, embossing devices, stamping devices, drilling machines, shaping devices, electroplating devices, electropolishing or other types of polishing devices, grinding machines, welding machines, brazing machines, soldering machines, devices and materials for adhesive bonding, grooving machines, laser sintering devices and arrangements, electrochemical deposition devices, slicing devices and cutters, and the like without limitations. In various aspects, the various types of pre-processing and post-processing devices or systems mentioned above without limitations may further include or may be provided with materials, energy sources, and other required arrangements for facilitating pre-processing and post-processing activities in conjunction with the 3D printing of the objects in an integrated manner.

In embodiments, the processing systems 512 may further include arrangements such as pre-processing software, building instructions, build-file creation software and hardware devices, finishing devices, washing arrangements, devices for stripping of support materials, devices for sectioning of CAD files, error correction arrangements, arrangements for decimation of surfaces, model cutting devices, scaling and positioning devices, STL file preparation, and the like.

In embodiments, the post-processing devices may be communicatively coupled with packaging arrangements. The communication may be managed through facilities such as movers, trolleys, conveyor belts, transport systems, other material handling systems 106, and the like. In an example, the packaging arrangements may include for example coatings 2410, encapsulants, shrink wraps, boxes, covers, plastics, labels, embossing arrangements, sterilization materials, antimicrobial, antibacterial, and antifungal agents, peel-apart pouches for surgical and other types of devices, sealants, and the like, and devices and systems for performing various operations to facilitate such packaging arrangements.

In an aspect of the present invention, the pre-processing systems 102 and post-processing systems 122 may be linked to material handling systems 106 and control robotics 104 for effective and automated management of materials, and manufacturing of objects during pre-processing and post-processing activities. For example, as depicted in the FIG. 1, a first control robotics 104 system is connected with a pre-processing system 102 and a second control robotics 104 system is connected with the post-processing systems 122. Similarly, a first material handling system 106 may be connected with the pre-processing system 102 and a second material handling system 106 may be connected with the post-processing system 122 and/or the packaging systems 118 or arrangements. In some embodiments, the first material handling system 106, the second material handling system, the first control robotics 104 system, the second control robotics 104 system may each be flexibly maintained so that a system associated with either of the pre-processing system 102 or post-processing system 122 or components thereof may be utilized for other systems as well. For example, a material handling device contained in the first material handling system 106 associated with the pre-processing system 102 may be utilized for carrying materials and packages in the post-processing system 122 and the packaging arrangements if needed.

The material handling system 106 may include for example in-plant material handling arrangements, in-process storage systems, feeders, transfers, conveyors, assemblies, industrial truck or other transports, automated guided vehicles, storage retrieval systems, cranes, and various other machines or devices. The material handling system 106 may facilitate in movement, storage, retrieval, and protection of material, goods, products and finished objects throughout the process of 3D printing, pre-processing, post-processing, and packaging activities.

The control robotics 104 may facilitate the pre-processing and post-processing activities including the packaging. In embodiments, the control robotics 104 may be configured so as to be included within the material handling system 106 so as to allow material handling activities to be controlled in an automated manner with the use of control robotics 104 involving the use of industrial robots, automated machines and CAM or CNC-integrated robots. In embodiments, the control robotics 104 (or control robotic systems) may be provided to facilitate other activities too other than material handling such as including without limitations automation of pre-processing and post-processing activities, precise control of these activities, regulated handling of pre-processing and post-processing activities in a defined manner and the like. In embodiments, the control robotics 104 may involve automatically controlled, re-programmable, and multipurpose devices or systems.

In embodiments, the control robotics 104 may be linked to various manufacturing systems 510 in the printing environment. The control robotics 104 may involve industrial or other types of robots with different types of arms and hands for example including handoff systems so as to facilitate specific customized activities. The robots may further include or be coupled to motors, vision systems, drones, liquid handling systems, conveyor systems such as cars, trucks, trains, routing systems, and the like. In an example, the routing system may be capable of Artificial Intelligence-based routing. In embodiments, the liquid handling systems may, for example, employ beverage containers or sterilization systems.

In embodiments, the entire arrangement of the pre-processing system 102, post-processing system 118, and the packaging arrangements, along with the 3D ecosystem may be designed so as to provide a flexible manufacturing setup for integration of various fabrication activities flexibly across the various devices, systems, and arrangements in the printing environment.

The material selection system 122 that is coupled with the 3D printer 100 is configured to make decisions regarding what materials are to be supplied in association with different processing activities for different objects undergoing 3D printing by the 3D printer 100 and at various points of time. For example, a particular 3D printing process performed for fabrication of a particular object may require certain materials at a different time or stages of fabrication or printing which may be supplied by the material selection system 122. It must be appreciated that the material selection system 122 may not only determine which materials are to be used and to select materials accordingly but may also manage the supply of the materials to the 3D printer 100. Accordingly, the material selection system 122 may be physically or mechanically connected with the material handling system 106, in an aspect of the present invention.

In embodiments, the material selection system 122 may be communicatively linked with the modeling system 108 so as to retrieve modeling information and information pertinent to an object to be printed so as to make decisions regarding material selections and supply accordingly. For this, the material selection system 122 may be pre-programmed in accordance with requirements to convey information by the modeling system 108 and also exchange information across the 3D printer 100, modeling system, and the material selection system 122. In an aspect of the present invention, the material selection system 122 may be coupled with or include artificial intelligence 132 systems for retrieving contextual information about printing of an object and accordingly make decisions regarding material selection and supply to the 3D printer 100 at different stages of processing or printing activities. The artificial intelligence 132 systems associated with the printing environment will be discussed later.

Figure 7:
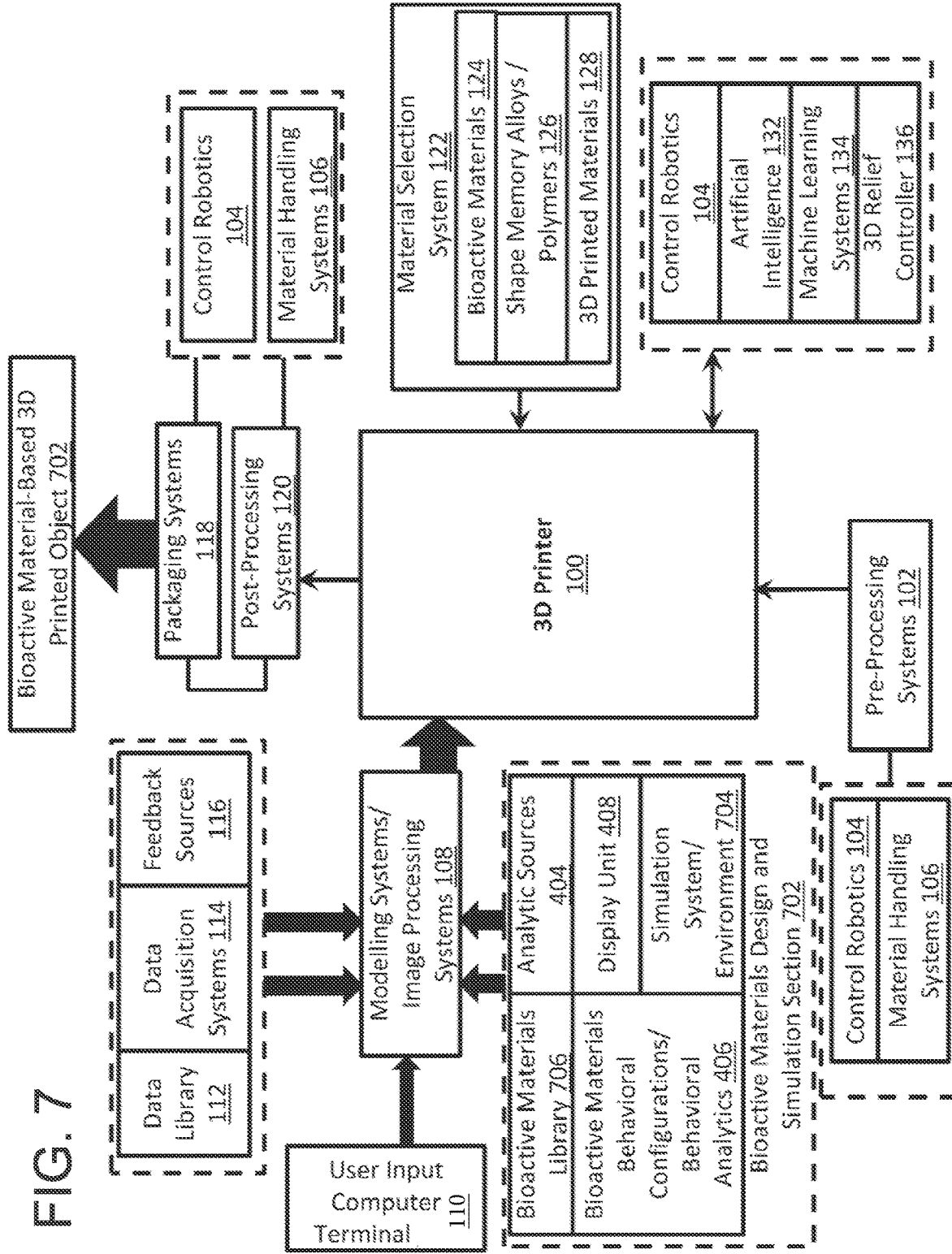
FIG. 7 is a diagrammatic view of an exemplary material selection system that may keep a library of different materials available and different materials needed for printing of different objects including bioactive materials in accordance with embodiments of the present disclosure.
Figure 8:
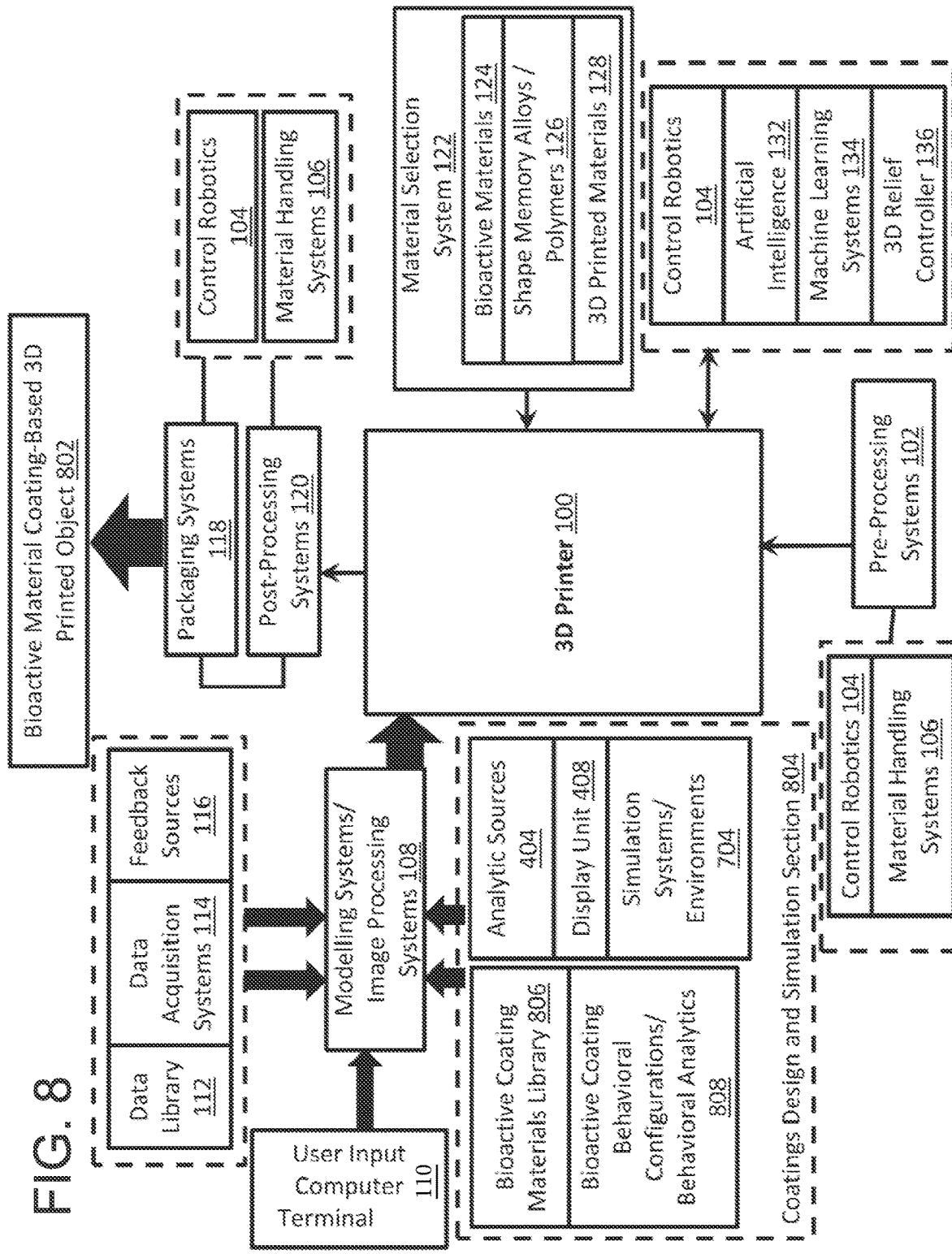
FIG. 8 is a diagrammatic view of an exemplary material selection system that may keep a library of different materials available and different materials needed for printing of different objects including bioactive coatings in accordance with embodiments of the present disclosure.

As illustrated in FIGS. 7 and 8, the material selection system 122 may maintain a library of different materials available and different materials needed for printing of different objects. For example, the materials may be bioactive materials 124. The library of bioactive materials 124 may be kept in a bioactive materials library 706, a bioactive coating materials library 806, and the like. Inputs from the bioactive coating materials library 806 may be used to print a bioactive material coating-based 3-D printed object 702. Bioactive materials library 706 may be included in a design and simulation section 702. Design and simulation section 702 may also include simulation systems (or environments) 704. A few examples of bioactive materials 124 or types of biomaterials that may be used by the 3D printer 100 for printing various types of objects in accordance with various embodiment of the present invention and whose details may be stored in the library of the material selection system 122 are without limitations time release materials, anti-inflammatory materials, anti-clotting materials, anti-carcinogenic materials, for example ITC, DIM and the like, angiogenesis inhibitors, blood pressure reducing materials, cholesterol lowering materials, transcription factor regulating materials, and materials that contain nutrients such as foods, lipids, vitamins, minerals, proteins, and the like. Few more examples of such materials or types of materials are bioactive materials 124 or bioactive composites coatings 2410, antimicrobial packaging materials, templates for tissue generation, materials for biosensors, antibacterial bioactive materials 124, bioactive materials 124 for use in orthopedics, bioactive materials 124 for use in circulation system, bioactive materials 124 for use in gene therapy, bioactive materials 124 for use in plastic surgery and body reconstruction, bioactive materials 124 for use in drug delivery systems, and the like.

Figure 4:
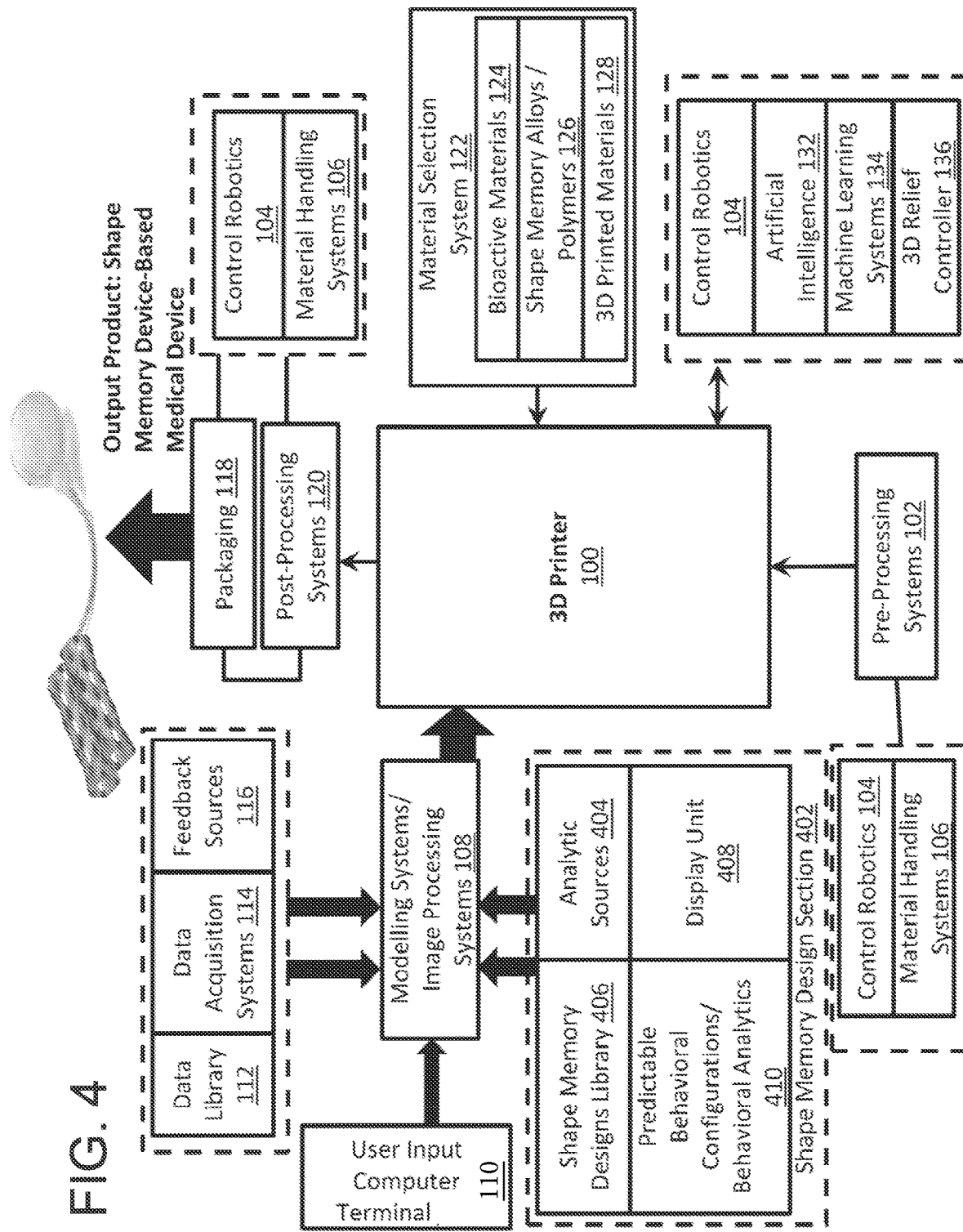
FIG. 4 is a diagrammatic view of an exemplary 3D printer 100 that may be configured to print shape memory-based devices in accordance with embodiments of the present disclosure.

In an example, the 3D printer 100 may be configured to print shape memory-based devices, as illustrated in FIG. 4. Accordingly, several types of materials that may be used by the 3D printer 100 for printing various types of shape memory-based devices in accordance with various embodiment of the present invention and whose details may be stored in the library of the material selection system 122 may without limitations include shape memory alloys (or shape memory polymers) 126, or shape changing polymers, or shape memory metals, and the like. In an example, these shape memory materials may be used by the 3D printer 100 for use in printing of automotive parts, aerospace components, biomedical devices, robotic infrastructure or components, telecommunication devices such as circuits and the like, crafts, surgical devices and tools, and various other devices for use in industrial or other applications. In embodiments, the 3D printer 100 may access a shape memory design library 406, analytic sources 404, and predictable behavioral configurations (or behavioral analytics) 410. Shape memory design library 406, analytic sources 404, and predictable behavioral configurations 410 may reside within a shape memory design section 40.

As illustrated in FIG. 1717, in various aspects of the present invention, the 3D printed objects or devices may be configured to change their shapes or configurations based on various parameters such as including without limitations temperature, chemical or physical environment, electrical environment, radiative environment, magnetic environment, and the like. For example, the 3D printed device 1702 may be configured to induce shape change by an electromagnetic pulse (EM) pulse, a RFID pulse, a magnetic pulse, an electrical signal, a light signal, heat, or cooling delivery for example by providing a fluid bed or heat bed or fluid delivery system, and the like. In embodiments, a deployment environment parameters library 1706, predictable behavioral patterns and behavioral analytics 1708, and an environment behavior analytics section 1710 may be used to configure the 3D printed objects or devices.

Figure 10:
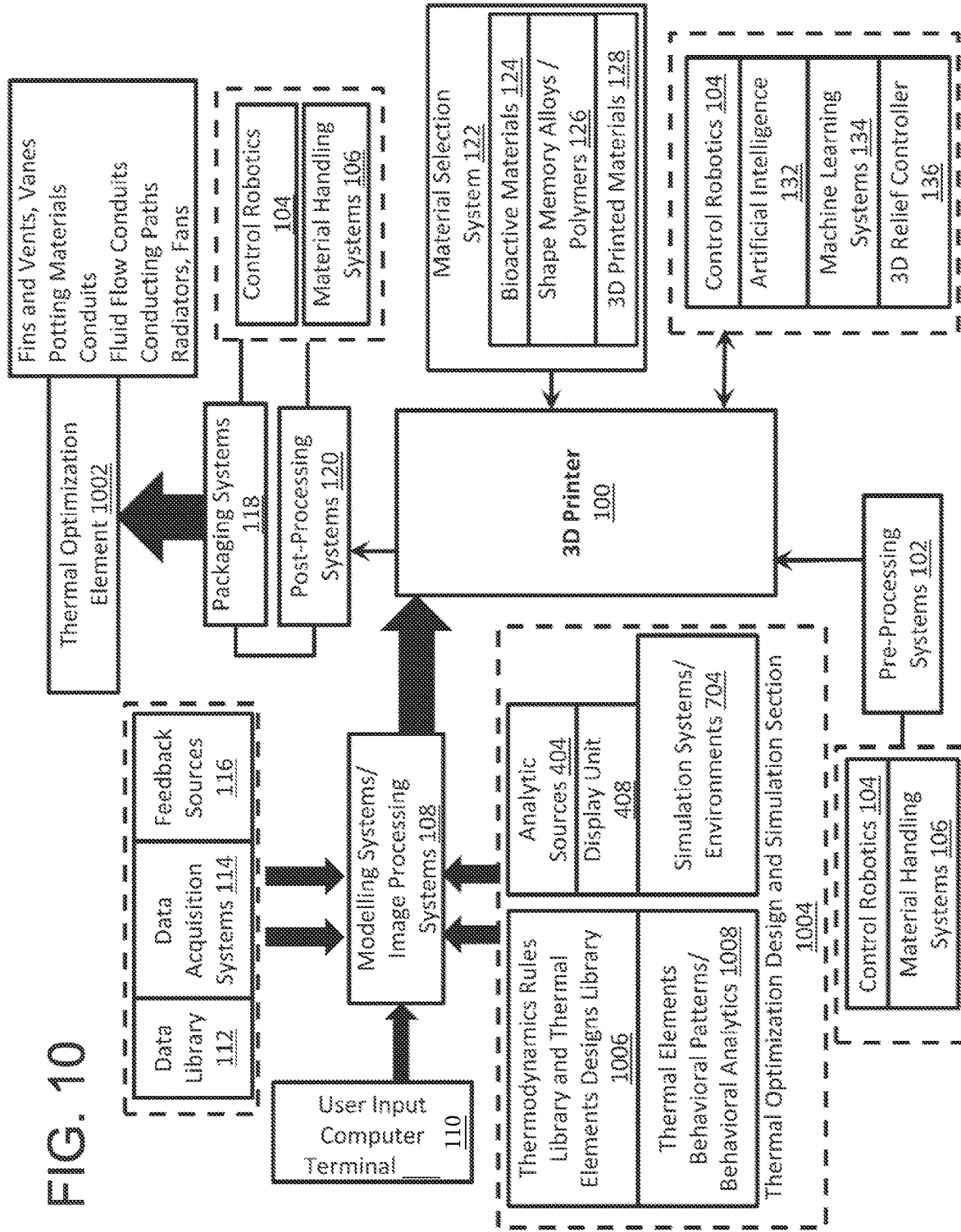
FIG. 10 is a diagrammatic view of an exemplary 3D printed shape memory device which may be configured to assume various shapes upon application of an external stimulus in accordance with embodiments of the present disclosure.

In various aspects of the invention, the 3D printed shape memory devices may be configured to assume various shapes upon application of an external stimulus as discussed above and illustrated in FIGS. 10, 11, and 12. In embodiments, the various types of devices that may assume different shapes and fabricated by the 3D printed shape memory devices may, for example, include without limitations anchoring elements such as feet, stakes, hook and loop, and the like. In another aspect, the 3D printer 100 may be configured to print shape memory devices that may assume biometric shapes upon application of an external stimulus. Few examples of such devices without limitations are vortex generators, sharkskin, scales, laminar flow generators, and devices requiring impact or momentum minimization shapes or curves, devices requiring weight bearing shapes in joints such as hinges or ball socket joints and the like. Laminar flow generator may generate laminar flow elements 1202. Laminar flow elements 1202 may exhibit laminar flow elements behavioral patterns and laminar flow elements behavioral patterns may be processed by laminar flow elements behavioral analytics 1228. In embodiments, the shape memory materials may be used for printing valves, or devices requiring thermal management shapes such as fins, vanes, heat sinks, potting areas, conductive paths, and the like.

Figure 9:
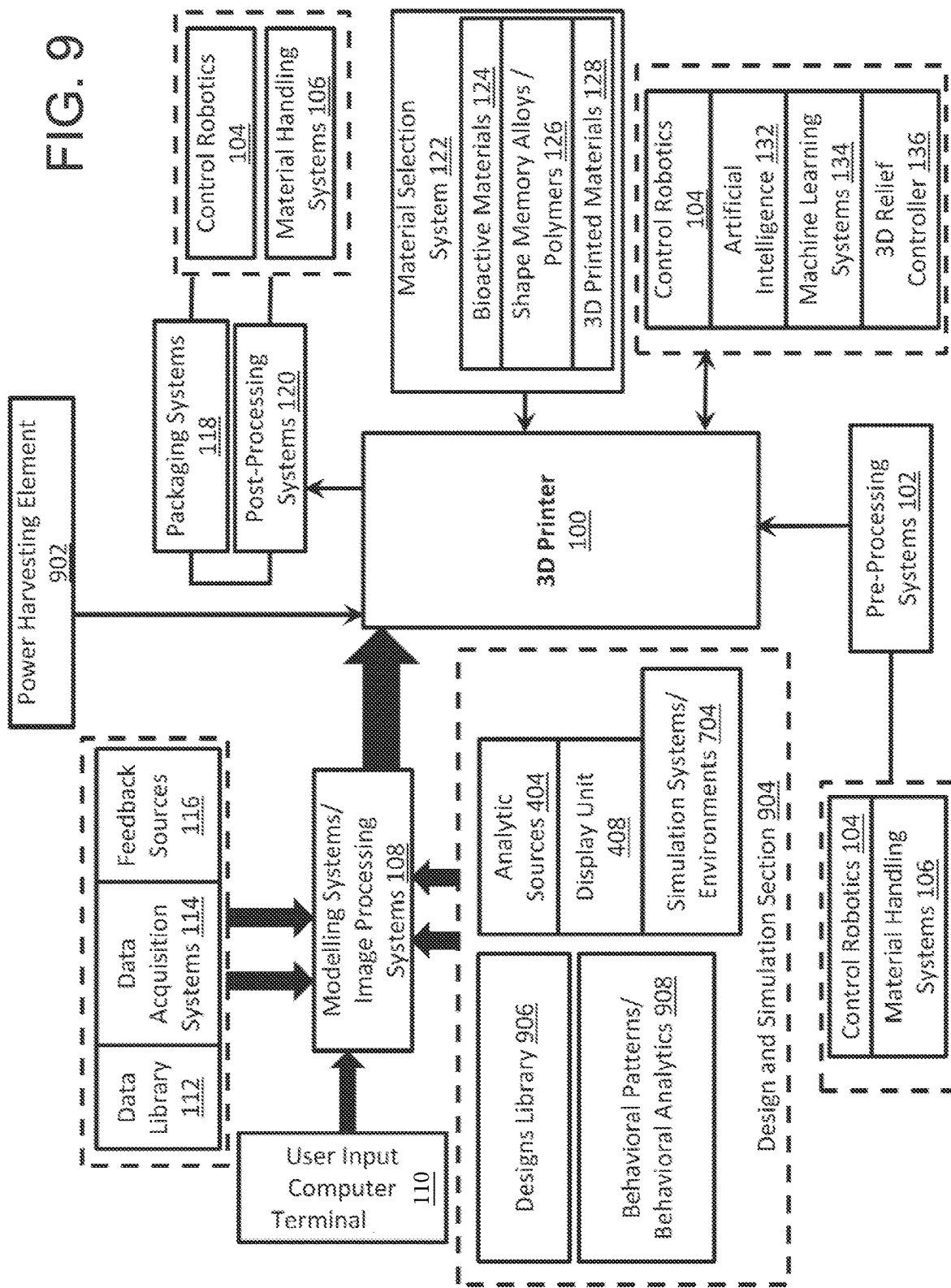
FIG. 9 is a diagrammatic view of several other elements may be adapted to be combined with the 3D printed objects or elements in accordance with embodiments of the present disclosure.

In an aspect of the present invention, several other elements 508 may be adapted to be combined with the 3D printed objects or elements, as illustrated in FIG. 9. These may, for example, include power harvesting elements 902. Such power harvesting elements 902 may function based on Peltier effect, Seeback effect, photovoltaic effect, and the like. Polymers, silicon, or hybrid materials may be used for generating the photovoltaic effect. In embodiments, processors adapted to perform defined set of functions may be adapted to be combined with the 3D printed elements 504. Power harvesting elements 902 may be referenced and/or modeled in a power harvesting designs library 906. Power harvesting designs library 906 may be maintained in a power harvesting design and simulation section 904. Power harvesting design and simulation section 904 may also include a power harvesting behavioral patterns (or behavioral analytics) 908. In embodiments, various types of power elements such as a battery, wireless power elements, electrical elements (e.g., electrical motors), gas-based power elements (e.g., methane or natural gas-powered elements), or any other gas may also be combined with the 3D printed elements 504. Other power elements may, for example, utilize fuels such as hydrocarbons like diesel, or gasoline, and the like. Still, other power elements (e.g., wind-based, turbine-based, solar power-based, hydro power-based, fluid flow-based, and/or temperature-based power elements) may be adapted to be combined with the 3D printed elements 504.

Several other elements 508 may also be adapted to be combined with thermal (or thermal optimization) elements 1002. Thermal elements 1002 may be kept in a thermodynamics rules library and thermal elements designs library 1006. The thermodynamics rules library and thermal elements designs library 1006 may be maintained in a thermal optimization design and simulation section 1004. Thermal optimization design and simulation section 1004 may also include thermal elements behavioral patterns (or behavioral analytics) 1008.

Figure 16:
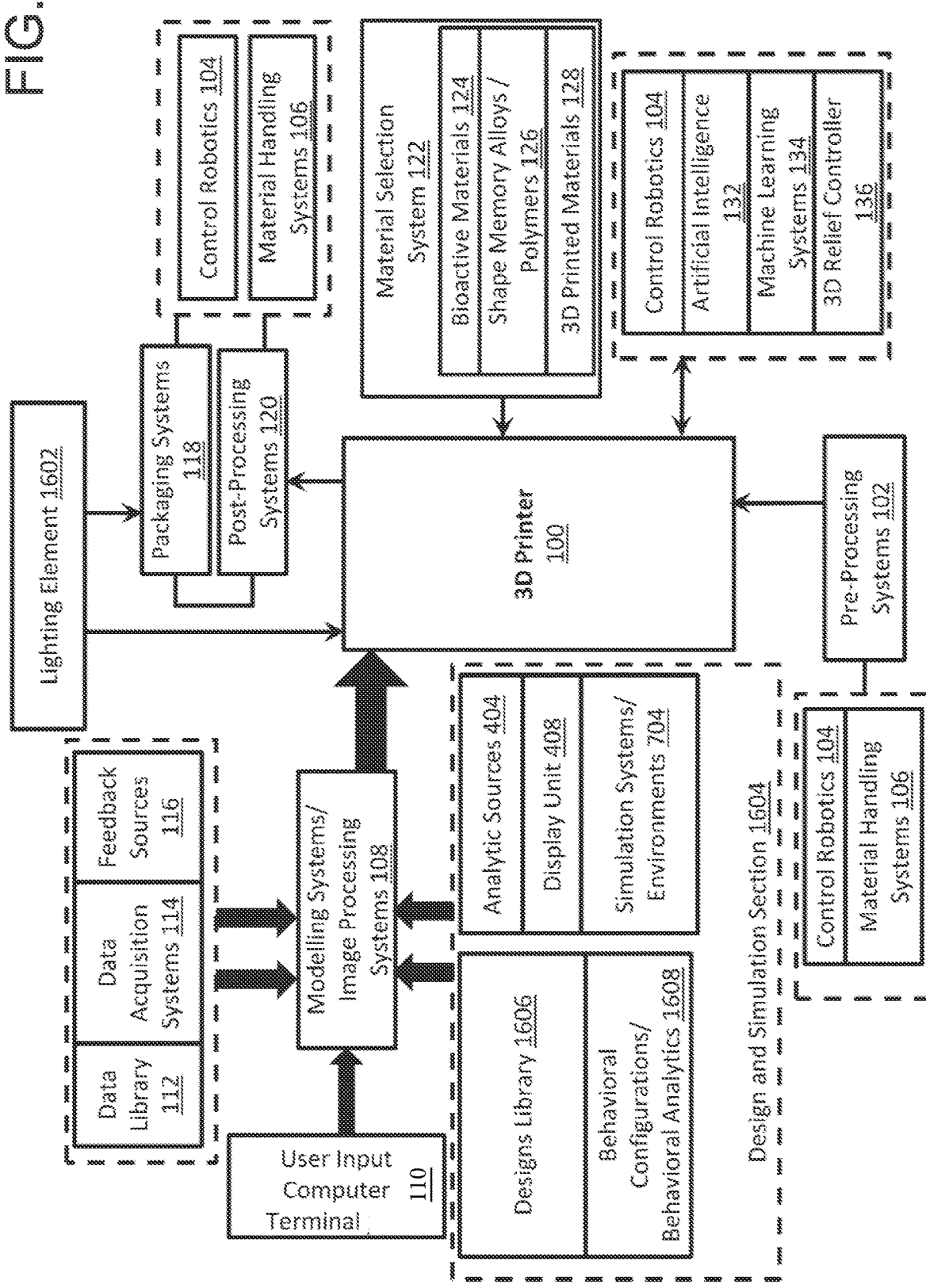
FIG. 16 is a diagrammatic view of an exemplary aspect of the present invention, lighting systems that may be adapted to be combined with the 3D printed elements in accordance with embodiments of the present disclosure.
Figure 17:
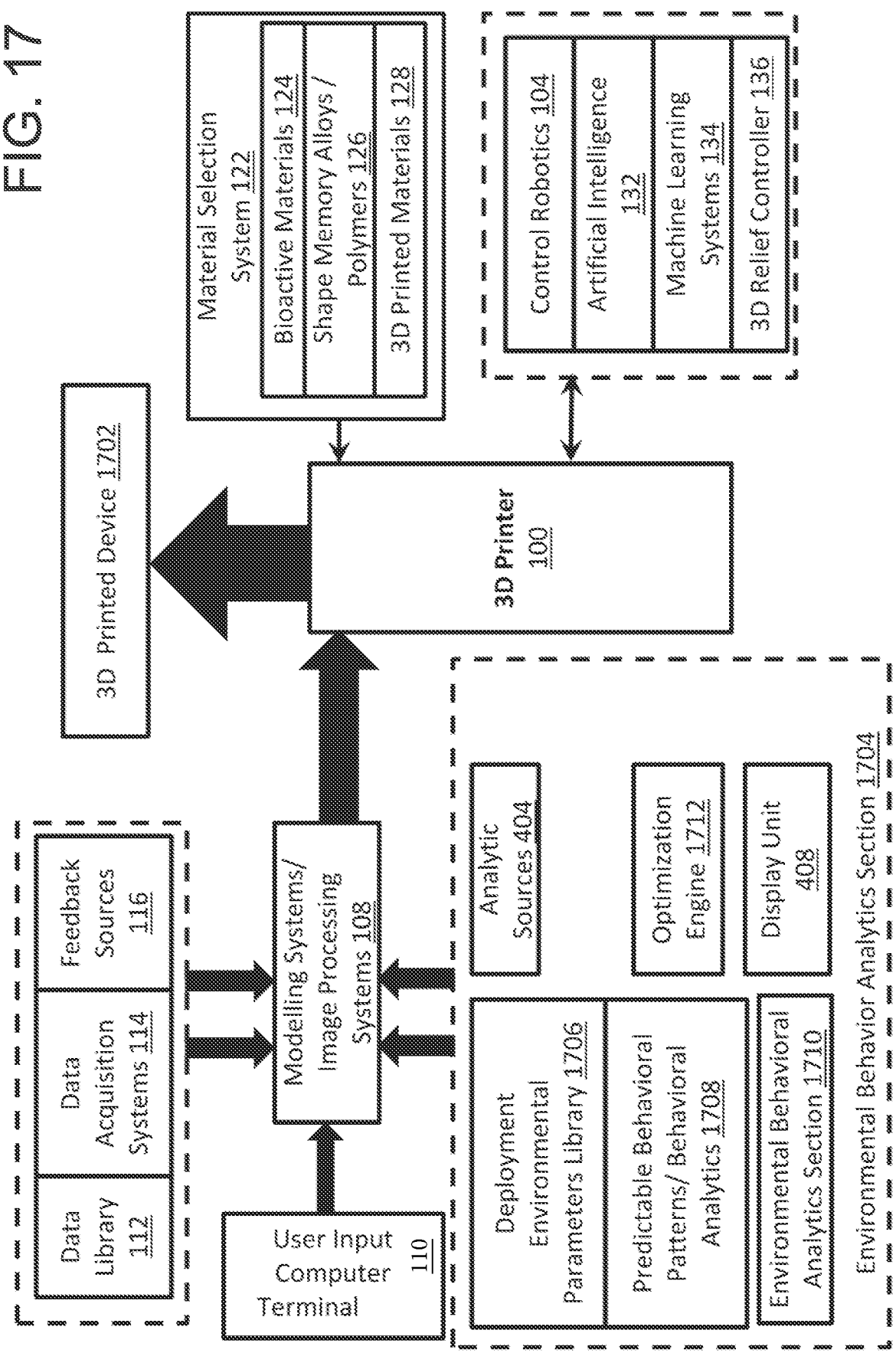
FIG. 17 is a diagrammatic view of an exemplary aspect of the present invention, the 3D printed objects or devices that may be configured to change their shapes or configurations based on various parameters such as including without limitations temperature, chemical or physical environment, electrical environment, radiative environment, magnetic environment, and the like in accordance with embodiments of the present disclosure.

In an aspect of the present invention, lighting systems may be adapted to be combined with the 3D printed elements 504, as illustrated in FIG. 16. For example, lighting elements 1602 may be used along with the 3D printed elements. Lighting elements 1602 may include semiconductor lighting such as LEDs, fiber optics, inductive systems, halogen based-lights, incandescent lights, fluorescent lights, light emitting polymers as lighting systems, and the like. These lighting elements 1602 may be used with the 3D printers 100 in accordance with some embodiments of the present disclosure.

In embodiments, other systems such as delivery systems, displays, spraying systems, including coatings 2410, additives, and spray-on design elements and the like.

In embodiments, various types of designs including, for example, various colors, patterns, trademarks, logos, identifiers, and advertisements etc. and combinations thereof may be employed in the 3D printing of the elements or objects.

In accordance with various embodiments of the present invention, the 3D printer 100 may be coupled to the intelligent unit 142 as mentioned above. The intelligence component 142 is configured to adapt to the 3D printing environment enabled by the 3D printer 100 and associated systems in the 3D ecosystem such as modeling systems, Data Section 140 and the like so as to automate tasks by learning environment, monitoring behavior of the various systems intelligently, retrieving contextual information, and by associating different sources of data from the Data Section 140 and the material selection section library.

The intelligence component 142 may include the control robotics 104 (or robotic systems), artificial intelligence 132 systems, machine learning systems 134, and a 3D relief controller 136. The control robotics 104 may automate material handling processes associated with 3D printing activities occurring at the 3D printer 100 and its associated systems in the 3D ecosystem. The artificial intelligence 132 systems may facilitate artificial creativity, artificial or automated scheduling and planning, automated reasoning, automated recognition, biologically inspired computing, speech recognition, facial recognition, artificial visioning, image processing, intelligent word recognition, object recognition, handwriting recognition, artificial intelligence-based diagnosis, intelligent control, data mining, concept mining, text mining, information extraction, contextual decision making, natural language processing, machine translation, pattern recognition, behavioral analysis, contextual analysis, virtual intelligence, and several other intelligent or semi-intelligent operations. Accordingly, several systems configured to perform these functions may be employed within the artificial intelligence 132 system or communicatively linked with the artificial intelligence 132 system. Few examples of these systems may be an automated scheduling and planning engine, computing systems, speech recognition systems, facial recognition systems, artificial visioning systems, handwriting recognition systems, diagnosis systems, control devices, data mining systems, knowledge systems, information management systems, natural language processing tools and software, machine translation devices, pattern recognition systems, behavioral analysis systems, context analysis systems, and the like.

In embodiments, the machine learning systems 134 may be integrated with the artificial intelligence system 132 to collectively perform intelligent or semi-intelligent operations in the 3D printing ecosystem 506 for allowing various activities associated with the modeling, and 3D printing of objects. The machine learning systems 134 may be enabled by implementing various intelligent operations or skills or capabilities such as including without limitations evolutionary computing, self-organizing maps, neural nets, radial basis function networks, fuzzy logic, neuro fuzzy machines, support vector networks, pattern recognition, predictive modeling, genetic programming, ontology and data analytics, kernel methods, and the like.

In embodiments, a machine learning system 134 may train one or more machine-learned models that are used by the artificial intelligence systems 132 to control the operation of the 3D printer. In embodiments, the machine learning system 134 may train a machine-learned to determine one or more attributes corresponding to the 3D printer or the peripheral systems (e.g., pre-processing system 102, post-processing system 120) that have a causal relationship with one or more attributes of a printed object. The machine learning system 134 may train the models in a supervised, semi-supervised, or unsupervised manner based on a training dataset. For example, the machine learning system 134 may train a machine-learned model to identify optimizations in the process that increase efficiency. In this example, the machine-learned model may determine optimal cooling times of an object in the post-processing of a printed object. In another example, the machine-learned model may determine optimal temperatures at which certain materials can be heated during the 3D printing process, whereby the optimization may reduce the power consumption of the 3D printer 100.

In embodiments, a machine learning system 134 may train one or more machine-learned models that are used by the modeling systems 108 to model objects that can be printed or to optimize designs of a model. For example, the machine learning system 134 may train a machine-learned model to identify object designs that are likely to lead to issues (e.g., part breakage, excess material waste, flawed designs, etc.). The machine learning system 134 may train the machine-learned models in a supervised, semi-supervised, or unsupervised manner based on a training dataset. In some of these embodiments, an artificial intelligence system 132 may receive an instruction from a user to generate a new object model, where the instruction indicates the type of object and one or more attributes (e.g., size, materials, intended use, etc.). In response to the instruction, the artificial intelligence system 132 may utilize a machine-learned model trained by the machine learning system 134 to generate the object model. A user may then verify or edit the object model using, for example, the CAD model section 200. In another example, a user may upload an object model of an object to the artificial intelligence system 132 and may indicate one or more attributes of the object to be optimized (e.g., strength, cost, or the like). The artificial intelligence system 132 may utilize a machine-learned model trained by the machine learning system 134 to optimize the model based on the user input and the machine-learned model. In this example, the machine-learned model may be trained using feedback relating to previously printed objects and feedback relating thereto. For example, the machine-learned model may be trained to identify thicknesses of components of an object that often result in an object breaking or otherwise faltering. In another example, the machine-learned model may be trained on feedback relating to previously printed objects to identify types of materials that are cheaper to use in a 3D printed object but are sufficient in quality.

The 3D relief controller 136 may receive instructions from the modeling system 108 about a defined model to be printed by the 3D printer 100 and real time data about printing process of the object so as to control relief, contours, patterns, designs and textures of the object. This ensures that an object, thus printed completely, adheres to the design prescribed by the modeling system. In case of any mismatch or discrepancy, the 3D relief controller 136 may either modify object printing pattern or may instruct the 3D printer 100 to stop functioning immediately.

Figure 2:
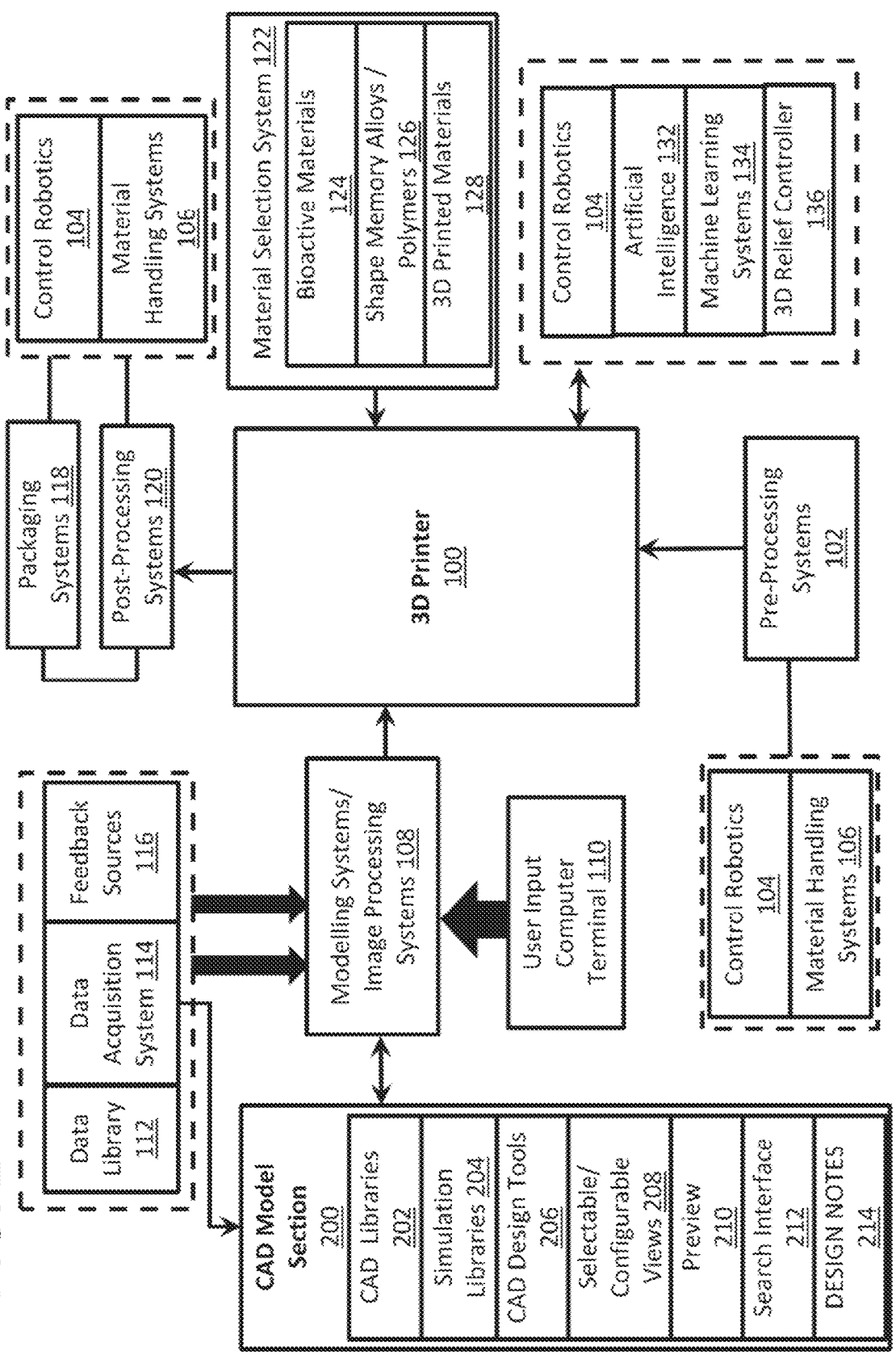
FIG. 2 is a diagrammatic view of an exemplary specialized computer system in accordance with embodiments of the present disclosure.

FIG. 2 illustrates a specialized computer system that is configured with elements in networked configurations in the computing environment with databases/libraries storing relevant data and parameters for the various modeling systems; servers; and the ability for various modules to be deployed on premises or in the cloud including as services in a services-oriented architecture. In the illustrated example, the printing environment involves a data section 140, including a data acquisition system, feedback sources 116 and data library 112 and the like. The printing environment further includes a modeling system 108 and a 3D printer 100 communicatively coupled to the modeling system 108. The printing environment further includes a CAD model section 200 communicatively coupled to the modeling system 108, so that the CAD model section 200 facilitates modeling of 3D printable objects using a set of CAD libraries 202 involving computer assisting designing programs and software. The printing environment may further include design notes 214, as illustrated in FIG. 2. In an aspect of the present invention, the data acquisition system 114 acquires imaging data from a real world physical object in the form of a digital file. Examples of data acquisition systems 114 may include ultrasound systems, magnetic resonance imaging (MRI) systems, computed tomography (CT) scanners, positron emission tomography (PET) scanners, infra-red (IR) inspection system, 3D scanners, radar and X-ray systems, and the like without limitations. Such imaging data is then imported into and combined with a 3D printing-compatible CAD model in the modeling system. It is noted that the foregoing list of data acquisition systems is relevant to biotech related printing environments. In printing environments relating to other fields, the data acquisition systems 114 will vary.

In embodiments, the CAD model section 200 of the modeling system 108 comprises CAD libraries 202 and the data pulled from these libraries is adapted to generate real world images. An image processing operator creates a 3D digital model from the image data sets using specialized modeling software such as CAD design tools 206. As an example, 3D Doctor™ is a commercially available modeling software used for creating 3D models of patient anatomy from medical images obtained through MRI, CT, PET etc. After the 3D digital model has been created, it is then saved to a file format supported by the 3D printer 100 for example, the STL (stereolithography) file format. The STL file may be transferred to the 3D printer 100 or to a computer connected communicatively with the 3D printer 100 by the operator or by the modeling system 108 automatically. The 3D printer 100 then utilizes the 3D digital model to create the printed object.

In embodiments, the CAD model section 200 may comprise simulation libraries 204 and the data may be pulled from simulation libraries 204 in the cloud to enable simulation of characteristics of a printed item in various environments. The simulation may render previews of the 3D digital model and ensure that the model meets requirements of an end user thereby saving time and costs.

The CAD model section 200 may further facilitate generation of configurable (or selectable) views 208 through a selectable interface, so as to present different views to a user during designing (e.g., a perspective view, a side view, a rear view, a plan view, an orthogonal view, cross-sectional view, and the like) that are taken at various latitudinal and longitudinal angles, planes, and cross-sections. These different views may be previewed through a preview 210 section before finally sending commands to the 3D printer 100 for the actual printing of an object. In some embodiments, a 2D printer may be coupled to output the designs as 2D prints for analysis and review. A user may also append notes to models and designs and store them in a repository for future reference. Various historically generated models and designs through the CAD model section 200 may be stored in the repository, which may be searched through a search interface 212 to leverage from the past activities and designs already maintained in the CAD model section 200.

In an aspect of the present invention, the CAD model section 200 may further include a diagnostic and repair module (not shown) that may be communicatively connected directly with the 3D printer 100, so as to either manually or automatically detect any design errors in the generated CAD model and to repair it during the 3D printing process without being required to stop the printing process and reverse the designing process again.

FIG. 3 illustrates a specialized, transformable electronic data structure representing a 3D printed physical article that optionally results from pre-processing, handling, 3D printing, post-processing and/or packaging in accordance with the various embodiments disclosed throughout this disclosure. The electronic data structure or object can represent the physical form of a 3D printed article. The electronic data structure may be transformed through a series of forms (or alternative data structures), reflecting various states and transformations of the physical article from an original state to one or more transformed states.

FIG. 4 illustrates a process flow for pre-processing, handling, 3D printing, post-processing and/or packaging a 3D printed article, involving a series of optional transformations of the physical article from an original material state to a final physical article. In the example of FIG. 4, the printing environment may include packaging systems 118 that package objects printed by the 3D printer 100. In embodiments, an object may be printed by the 3D printer 100 and the post-processing systems 120 receive the printed object from the 3D printer 100. For example, a robotic arm of the control robotics 104 may grip and move the object from the printer 3D to a post-processing system 120 where the object may be post processed. Post-processing may include cooling the object, painting the object, coating the object, sanitizing the object, and the like. The control robotics 104 may then transfer the post-processed object to the packaging system 118. The packaging system 118 may include one or more robotic devices (i.e., control robotics 104) that package the printed object. Depending on the type of object, the packaging process may vary. For example, for food items meant to be eaten, the packaging process may include wrapping the food in a wrapper. In another example, for a surgical tool or biomimetic device, the packaging process may include shrink wrapping and sealing the tool or biomimetic device in a sanitary package.

Figure 18:
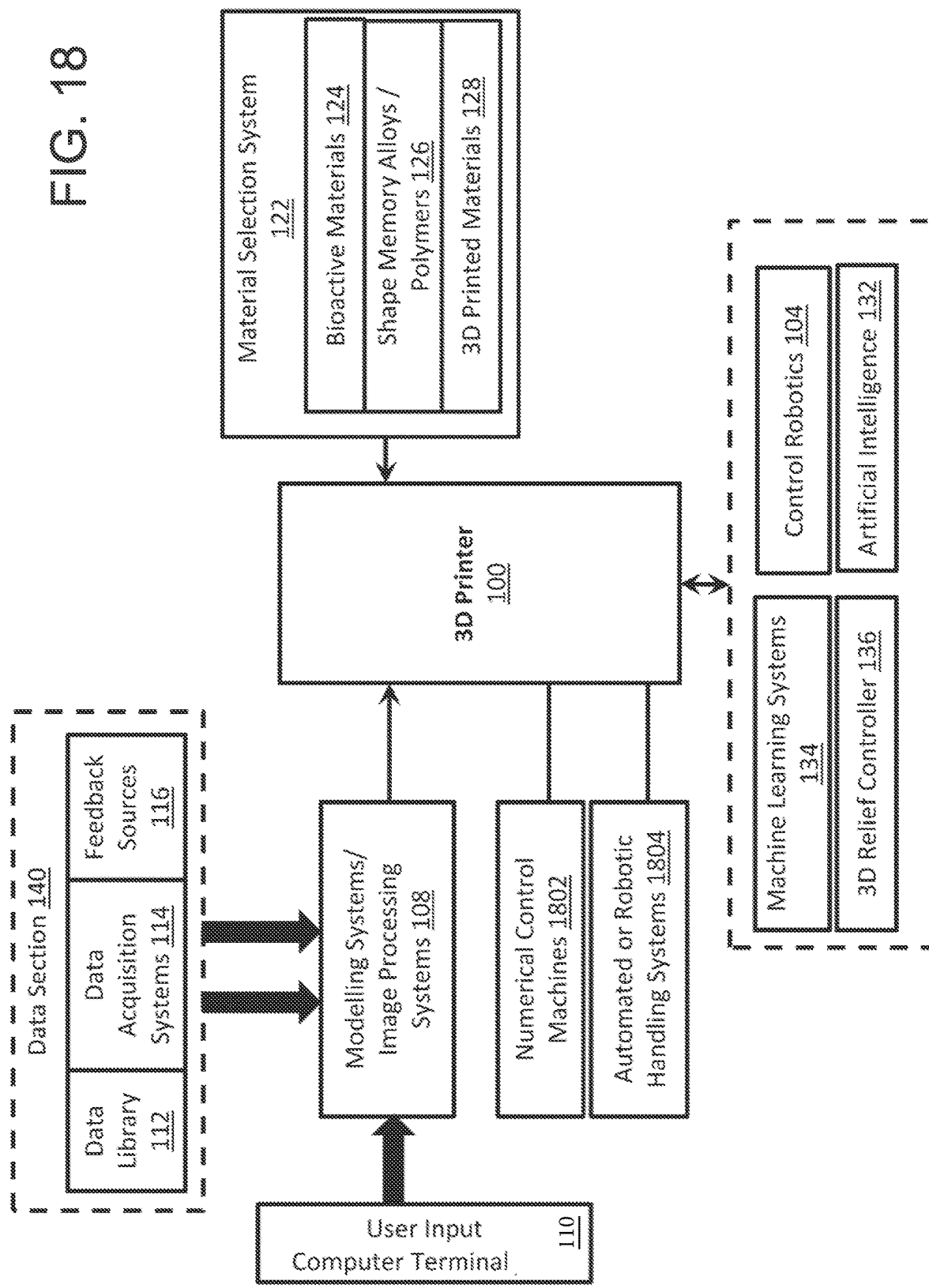
FIG. 18 is a diagrammatic view of an exemplary example of a 3D printer printing environment with an automatic robotic handling system, a pre-processing system and a post-processing system in accordance with embodiments of the present disclosure.

FIG. 18 illustrates an example of a 3D printer 100 printing environment with an automatic robotic handling system 1804, a pre-processing system and a post-processing system, in accordance with embodiments of the present disclosure. As illustrated in FIG. 18, the automated robotic handling system 1804 may be used for performing automated or semi-automated operations in connection with the 3D printing process. For example, the automated robotic handling system 1804 may include computer operated numerical control machines 1802 (CNC) and material handling systems 106. The CNC machines may operate based on instructions received from the 3D printer 100 or the modeling system 108, so that CNC operations can be integrated synchronously with those of the 3D printer 100 operations. While the pre-processing systems 102 and post-processing systems 122 are employed to perform activities before the 3D printing process begins or after an object is printed by the 3D printer 100, the automated robotics handling systems 1804 operate to facilitate the tasks of 3D printing in association with the 3D printer 100 during the printing process itself. For example, the material handling system 106 may facilitate management of material that is conveyed to the 3D printer 100 and may operate based on maintained records such as through a bill of material section or material scheduling, and the like. The material handling system 106 may include robotic systems for automating the handling of materials.

The pre-processing system 102 and the post-processing system 122 may perform various other activities before and after the printing process using other fabrication systems. The pre-processing system and the post-processing system may be provided in the proximity of the 3D printing ecosystem 506 so as to allow a wide range of other processing, pre-processing or post-processing activities in conjunction with the 3D printing. Examples of such fabrication systems have been provided in conjunction with FIG. 1. Further, the pre-processing system and the post-processing system have also been discussed already in conjunction with FIG. 1.

FIGS. 7, 8, 11, and 19 relate to printing environments used in connection with healthcare, biomedical, and biomimetic applications. For example, in FIG. 7, the 3D printer 100 prints bioactive material-based 3D objects 702. A bioactive material-based 3D object is an object that can be used in the regeneration of organic tissues (e.g., human organs). In these embodiments, the bioactive materials may be used to print entire or portions of bones, kidneys, hearts, skin, livers, and the like. In this example, the bioactive materials library 706 may include information relating to the printing of bioactive material-based 3D printed objects 702, such as materials used, the amounts of materials used in each layer, the ordering of layers, the amount of time needed to print an object, and the like.

In the example of FIG. 8, the 3D printer 100 prints bioactive material coating-based 3D printed objects 802. In these embodiments, the 3D printer 100 may print objects that are made of inorganic compounds but coated with bioactive materials. Such objects 802 may be implanted in an organism to help regenerate tissues in the body of the organism. In this example, the bioactive coating materials library 806 may include information relating to the printing of bioactive material coating-based 3D printed objects 802, such as materials used, the amounts of materials used in each layer, the ordering of layers, the amount of time needed to print an object, and the like.

Figure 11:
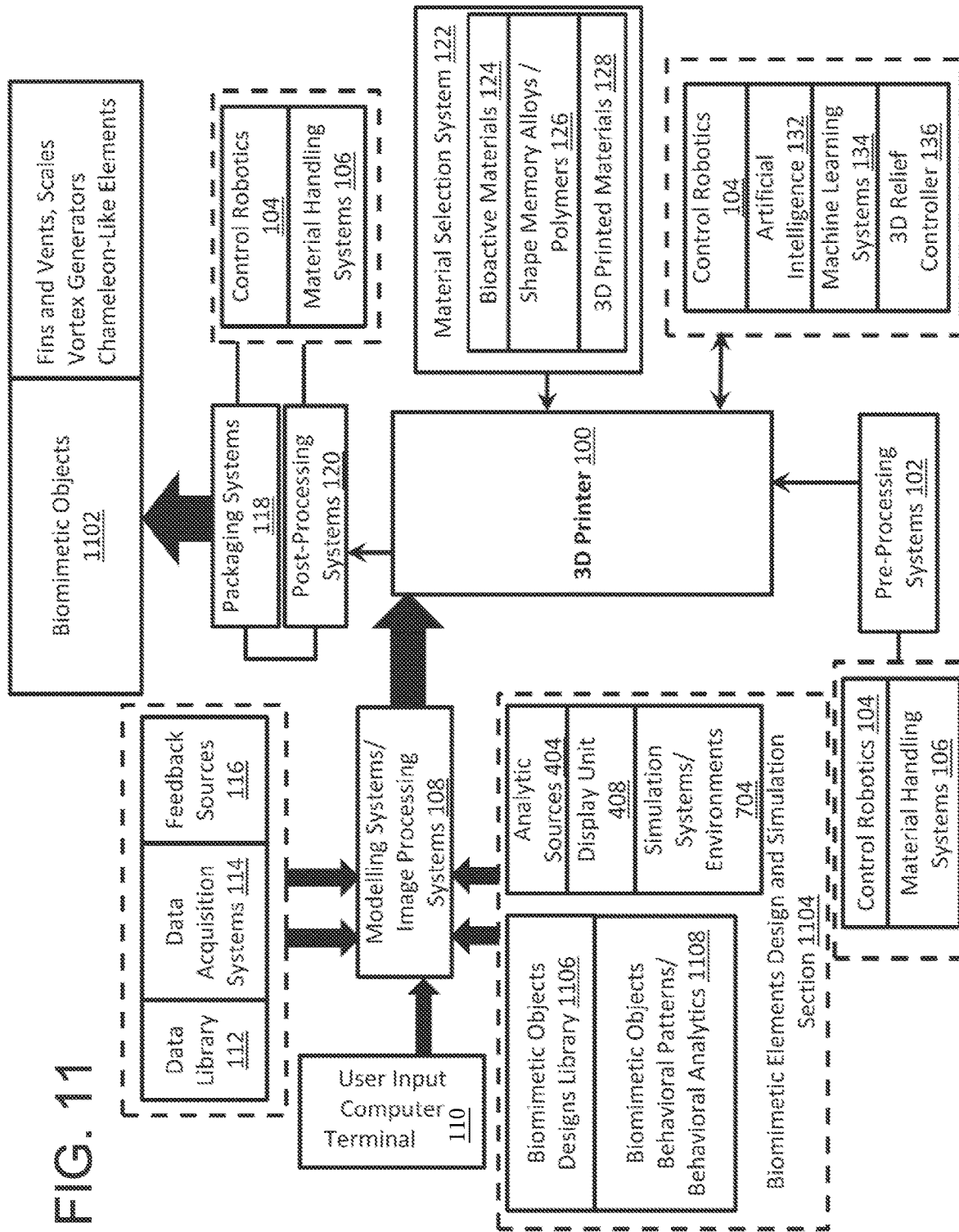
FIG. 11 is a diagrammatic view of an exemplary 3D printed shape memory device that may be configured to assume various shapes upon application of an external stimulus in accordance with embodiments of the present disclosure.
Figure 12:
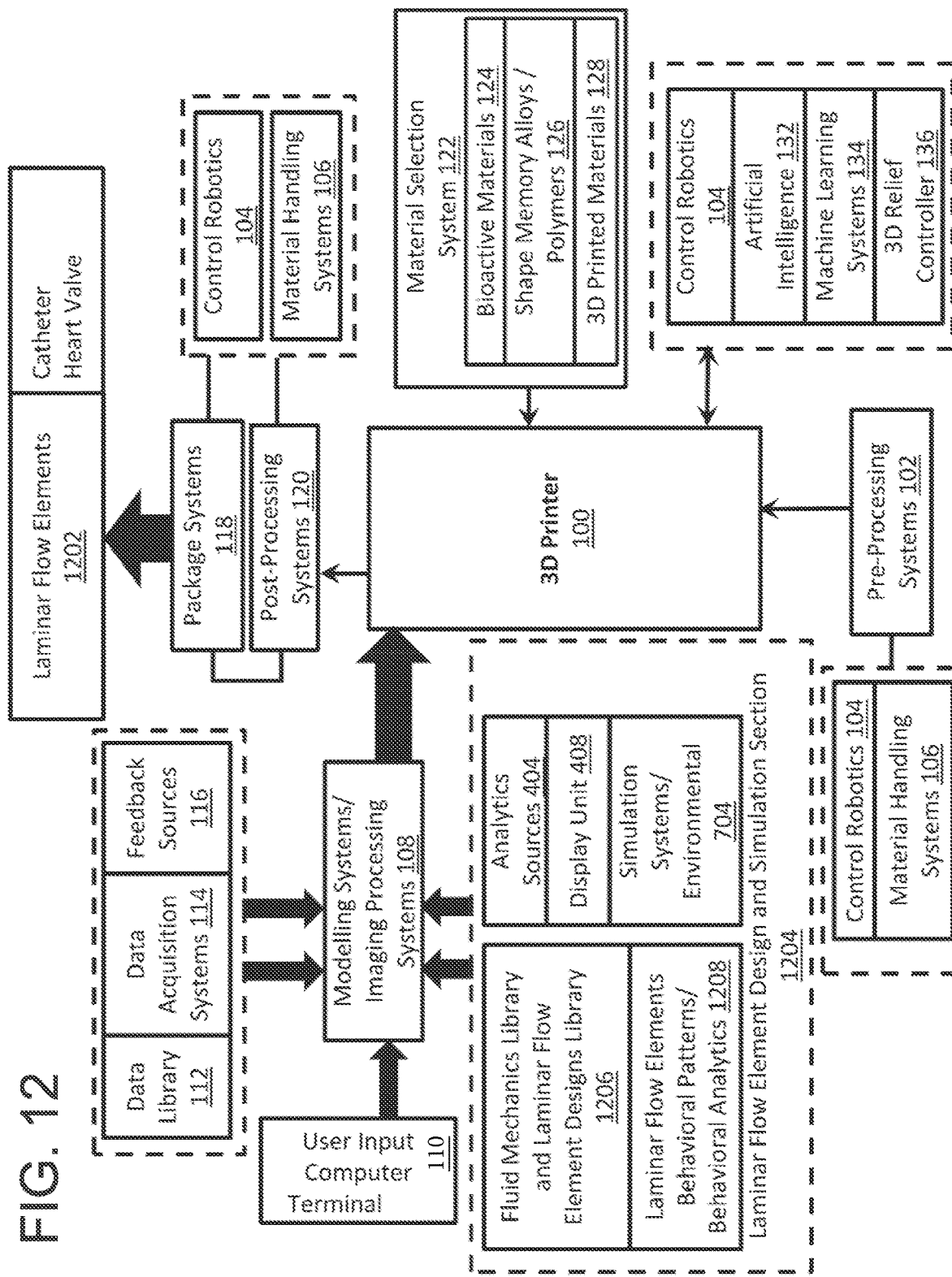
FIG. 12 is a diagrammatic view of an exemplary 3D printed shape memory device that may be configured to assume various shapes upon application of an external stimulus in accordance with embodiments of the present disclosure.
Figure 13:
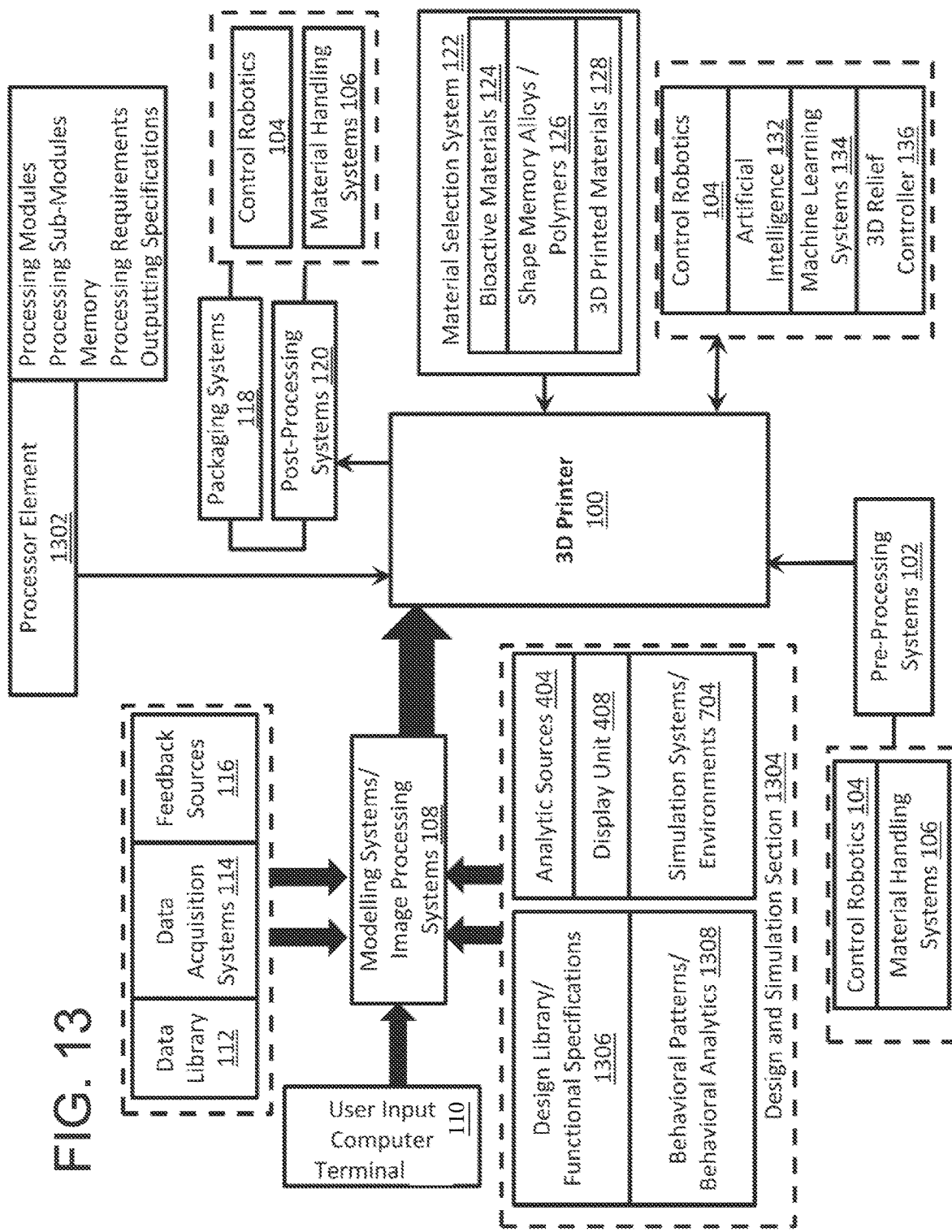
FIG. 13 is a diagrammatic view of an exemplary 3D printed shape memory devices that may be configured to assume various shapes upon application of an external stimulus such as behavioral and patient expressions in accordance with embodiments of the present disclosure.

In the example of FIG. 11, the 3D printer 100 prints biomimetic objects 1102. In these embodiments, the 3D printer 100 may print objects 1102 that are made of inorganic compounds that are suited to be mimic a function of a human body part or system. For example, the 3D printer may print implantable medical devices such as joint replacements or prosthetics. In this example, the biomimetic objects designs library 1106 may include information relating to the printing of biomimetic objects 1102, such as materials used, the amounts of materials used in each layer, the ordering of layers, the amount of time needed to print an object, and the like.

Figure 19:
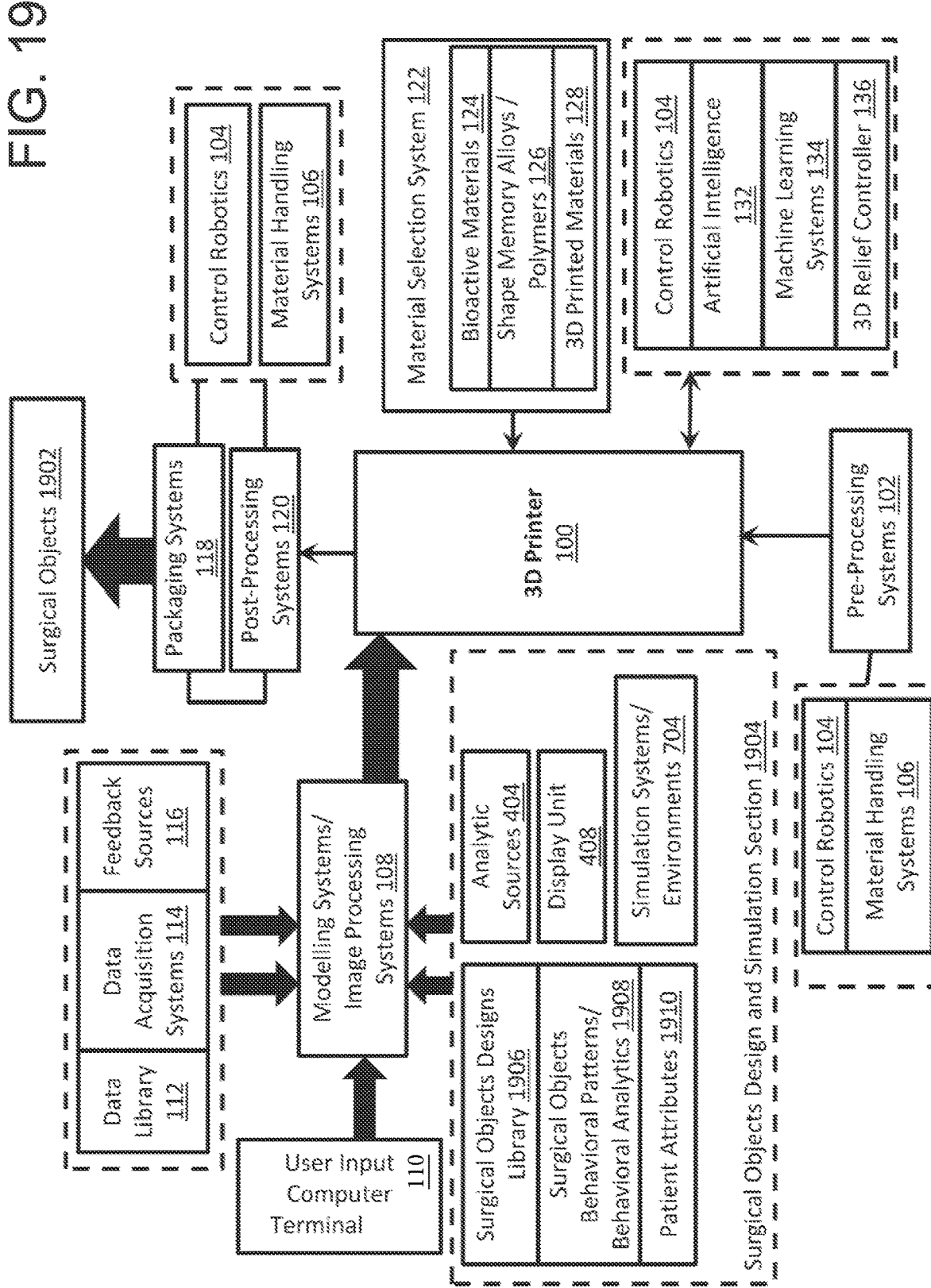
FIG. 19 is a diagrammatic view of an exemplary 3D printed shape memory devices that may be configured to assume various shapes upon application of an external stimulus such as tool use, behavior, and history in accordance with embodiments of the present disclosure.

In the example of FIG. 19, the 3D printer 100 prints surgical objects 1902, such as surgical tools and tool attachments. In these implementations, the 3D printer 100 may be located in a hospital or surgical center, such that surgical objects 1902 may be printed on demand. Furthermore, in embodiments, surgical objects 1902 may be custom made based on the needs of the surgeon or the patient. In some embodiments, a surgical objects design and simulation section 1904 stores patient attributes that include the attributes of a patient (e.g., size, sex, allergies, and the like). In this way, a custom made surgical device may be modeled and 3D printed based on the attributes of a patient undergoing surgery. In embodiments, the surgical objects design and simulation section 1904 stores a surgical objects designs library 1906 that includes information relating to the printing of different types of surgical objects 1902, such as materials used, the amounts of materials used in each layer, the ordering of layers, the amount of time needed to print an object, and the like.

As can be appreciated, the 3D printing examples of FIGS. 7, 8, 11, and 19 may be used in a healthcare facility or biomedical facility to generate on demand objects used in connection with the treatment of an organism. In this way, a healthcare facility or biomedical facility may reduce costs by having a just-in-time inventory of typically expensive medical devices.

Figure 6:
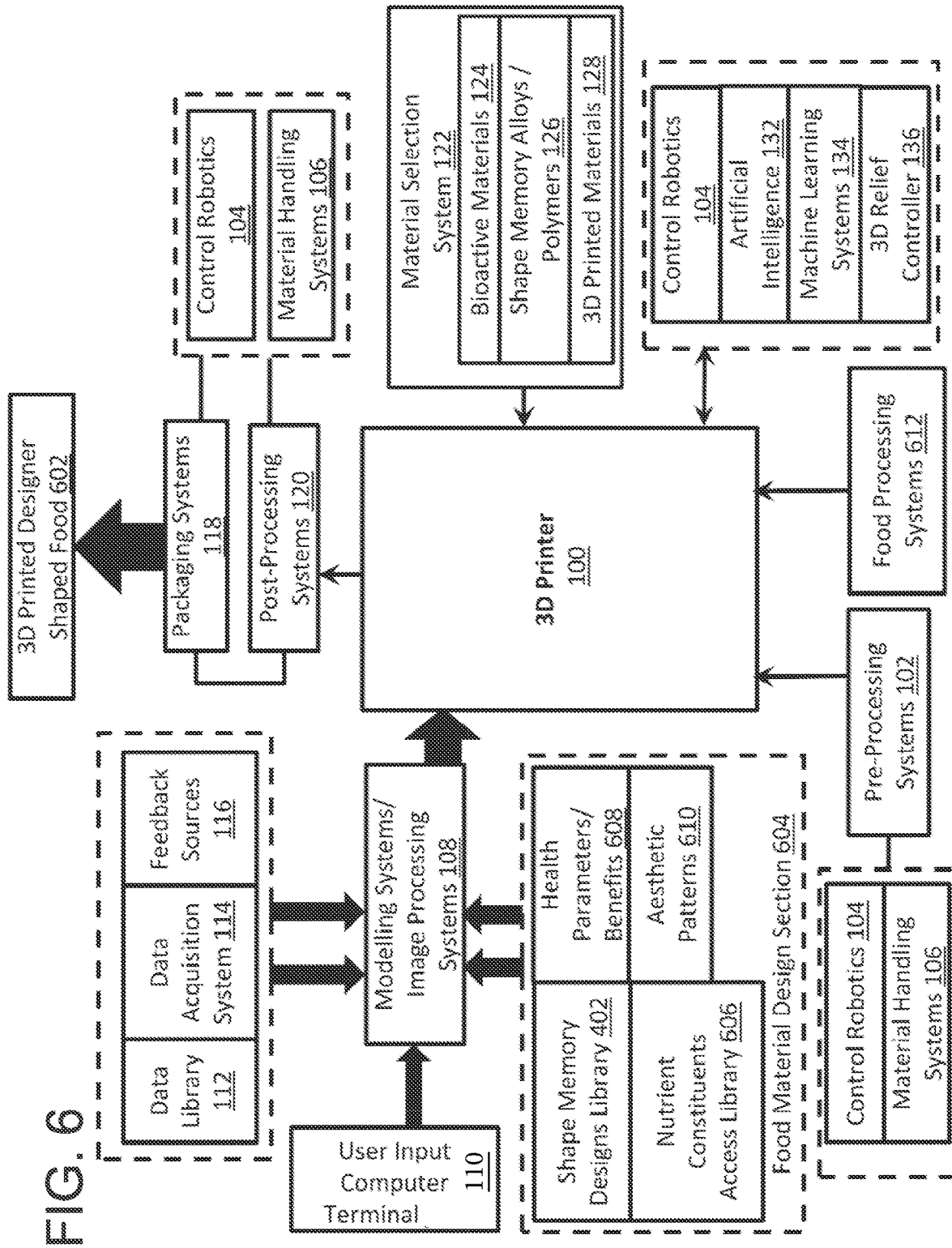
FIG. 6 is a diagrammatic view of an exemplary technology stack for electronic data, computing and networking in a 3D printing environment including the examples of 3D printing of a personalized (or personalized printed) food item involving one or more components of the printing environment in accordance with embodiments of the present disclosure.
Figure 22:
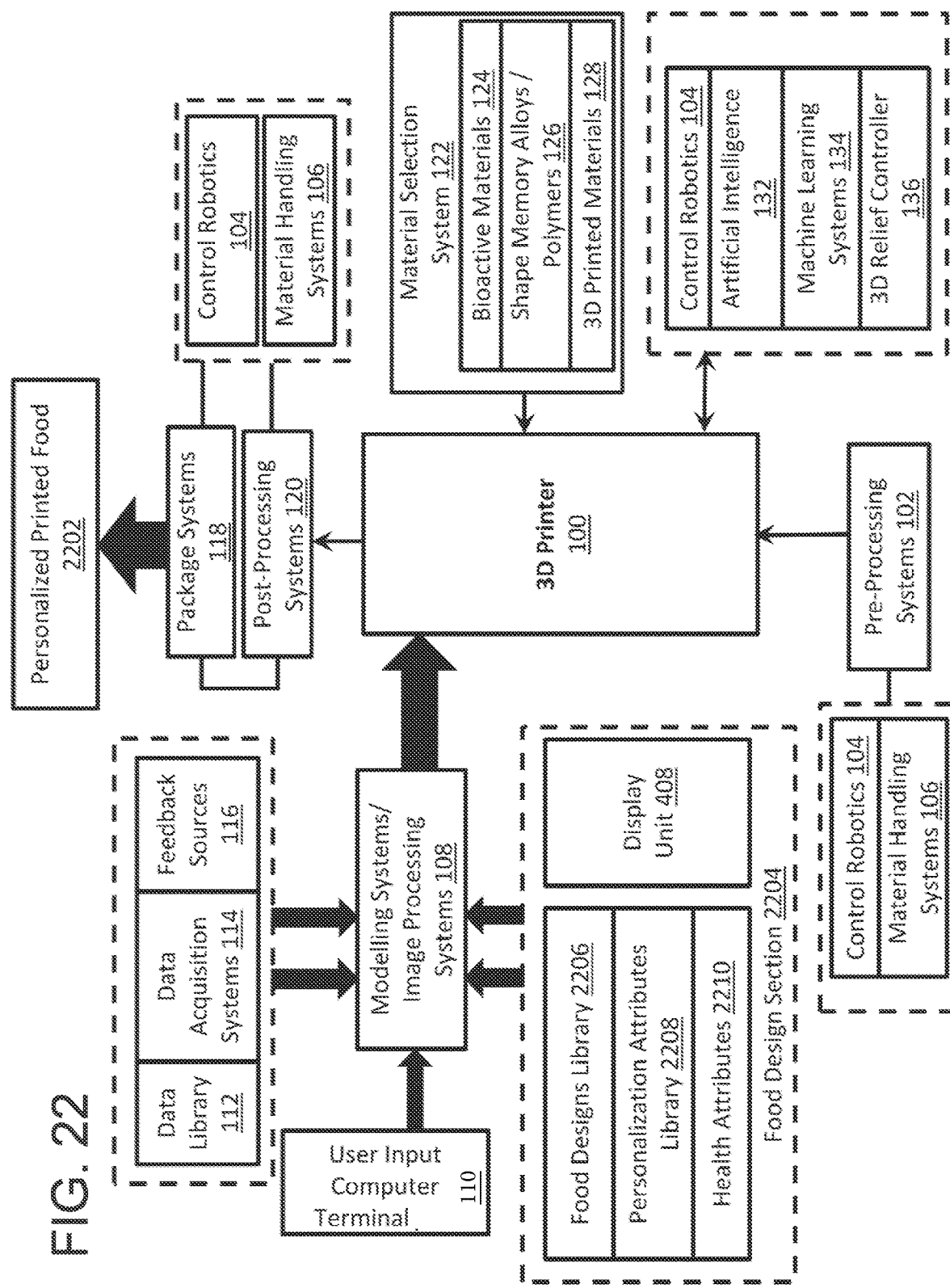
FIG. 22 is a diagrammatic view of an exemplary example of 3D printing of a personalized (or personalized printed) food item involving one or more components of the printing environment in accordance with embodiments of the present disclosure.
Figure 23:
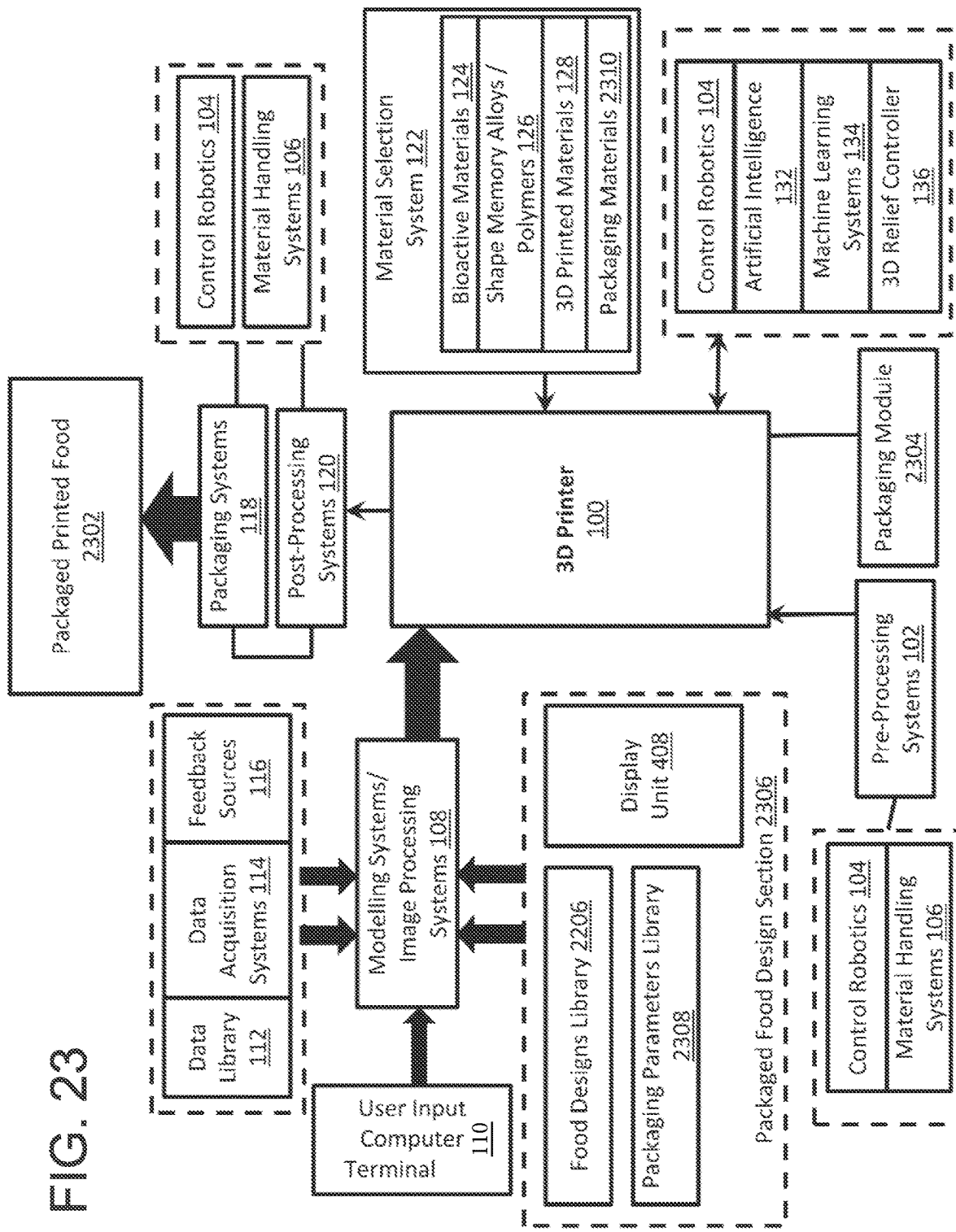
FIG. 23 is a diagrammatic view of an exemplary example of 3D printing of a personalized (or personalized printed) food item involving one or more components of the printing environment in accordance with embodiments of the present disclosure.

FIGS. 6, 22, and 23 illustrate examples of 3D printing of a personalized (or personalized printed) food item 2202 involving one or more components of the printing environment as depicted in conjunction with FIG. 1. The personalization may be, for example, based on user preference for a particular shape or other food attributes. Alternatively, the personalization may be based on user characteristics or nutritional requirements. 3D printing of personalized food items may utilize input from a food material design section 604. A food material design section 604 may include a shape memory designs library 402, a nutrient constituents access library 606, health parameters (or benefits) 608, aesthetic patterns 610, and the like. In these embodiments, the shape memory designs library 402 may include records for different types of food items. Each record may indicate the materials that are used to print the item, instructions for pre- and post-processing, a model of the food item, an amount of time needed to print the food item, an amount of time needed to heat or cool the food item, an order of printing operations, and the like. In embodiments, food processing systems 612 may provide inputs to facilitate 3D printing of personalized food items.

As depicted, among other components that are already discussed above, a food design section 2204 is provided in the proximity of the modeling system 108 and is communicatively coupled with the modeling system. The food design section 2204 may include a food designs library 2206, a personalization attributes library (or profiles) 2208, and a health attributes 2210 library. A personalized printed food item 2202 may be a 3-D printed designer shaped food item 602.

The food designs library 2206 may store a set of readily available modular designs to be used in combination or isolation for designing a personalized food item. The designs are stored in the library based on information on historically printed personalized food items, user preferences 304, or sales data 306 corresponding to various food items designs and the like. The library may include information on various shapes, tastes, aesthetics, flavors, colors, and the like attributes of food items.

The personalization attributes library 2208 may contain personalized information about individuals for use in printing a personalized food item. The personalized information may, for example, include information pertinent to shape, taste, size, flavor, color preferences of food items by individuals. The personalized information may be identified through personal user's profiles such as obtained from social networking platforms. In an example, the personalization attributes library 2208 may be associated with such a social networking platform hosting a personal profile for allowing printing of food items based on individual preferences.

The health attributes 2210 library may store information pertinent to general health standards and health rules. In specific cases for personalized food printing, however, the health information may be associated with individual health routines, health status, health guidelines and nutritional requirements.

A display unit 408 may be provided within the design section so as to facilitate display and preview 210 of various personalized designs developed by the food design section 2204. The display unit 408 may be coupled with an input device such as a computer terminal 110 for providing feedback through various sources such as the feedback sources wherein individual persons can modify the designs further by providing feedback.

In operation, a user provides a 3D design of a food item incorporating user preferences 304 through a data acquisition system or through other feedback sources 116. In another aspect, the user preferences 304 may be retrieved from personalization profiles stored in the design section. In embodiments, the design may, for example, be provided through a 3D scanner. Based on the user preferences 304, a design file is created which may be processed by the modeling system 108 to create a 3D digital model. The 3D model may be processed or colored and further graphics and text may be added as required by the user. The model is then saved to a file format supported by a 3D printer 100 like STL file (*.stl), ascii VRML file (*.wrl), SolidView SFX file (*.sfx), Binary PLY file (*.ply) etc. and sent to the 3D printer 100 by the modeling system. The 3D printer 100 utilizes the file and selects food raw materials from the material selection system 122 to 3D print the food item as per the design and shape specified by the user.

A post processing module connected to the 3D printer 100 may then perform post processing such as baking the food item or sprinkling an additive over the surface of the food without destroying the 3D structure of the food, so as to add different flavors and colors to the food and improve the aesthetics.

In one embodiment, the data acquisition system 114 may also acquire as input user characteristics including the genetic profile or blood sample of the user. In another embodiment, this data may be gathered from personalization attributes profiles 2208. The data is then analyzed to determine ideal ingredients for a food item for the user. In embodiments, the user may provide nutritional requirements in terms of the percentage of carbohydrates, proteins, fat etc. that the food item should contain. The material selection system 122 then selects food raw materials based on these nutritional requirements to generate a personalized food item for the user. In embodiments, the personalization is based on protein profile constructed from vegetable protein sources.

In embodiments, a packaging module 2304 may be provided in association with the 3D printer 100 for adding a removable packaging layer to the 3D printed food item before presenting it to the user or before any post-processing activity, as illustrated in FIG. 23. FIG. 23 illustrates an example of 3D printing of a food item with a removable packaging payer involving one or more components of the printing environment as depicted in conjunction with FIG. 1 and FIG. 23.

The packaging module 2304 may be communicatively connected with the material selection system 122 to retrieve raw packaging materials 2310 for use in the 3D printing-based packaging process. In an example, the packaging may be provided as a separate package covering to cover the printed food item, or as a packaging layer, or as a monolithic coating and the like. The packaging layer may include coatings 2410, encapsulants, shrink wraps, boxes, covers, plastics, and the like. The packaging layer may be vacuum airtight to ensure safer and hygienic storage and preserve flavors. The packaging layer may be easily removed from the printed food item through simple processes like washing or soaking or through the application of heat like evaporation or boiling. In embodiments, the packaging module 2304 adds a trademark or logo to the packaging layer before distributing the food item to the user or before presenting it to the post-processing systems 122.

In an example, a packaged food design section 2306 may be provided in connection with the modeling system. The packaged food design section 2306 may include a food designs library 2206 similar to the food designs library 2206 as discussed in conjunction with the previous figure already. The packaged food designs section may further include a packaging parameters library 2308 that may store information on possible mechanisms to be used for removal of the packaging layer from the 3D printed food. The packaging removal mechanisms may be different for different types of packaging layers and for layers fabricated from different types of materials. Therefore, the packaging parameters library 2308 may store information pertinent to the removal mechanisms in association with various materials and various types of packaging layers so as to use this information by the modeling system 108 or the design section to generate packaged food designs automatically. In addition, the packaging parameters library 2308 may further store information about various characteristics associated with different types of packaging types and packaging materials. The library may serve as a knowledge source for facilitating design of the packaged food items.

Figure 24:
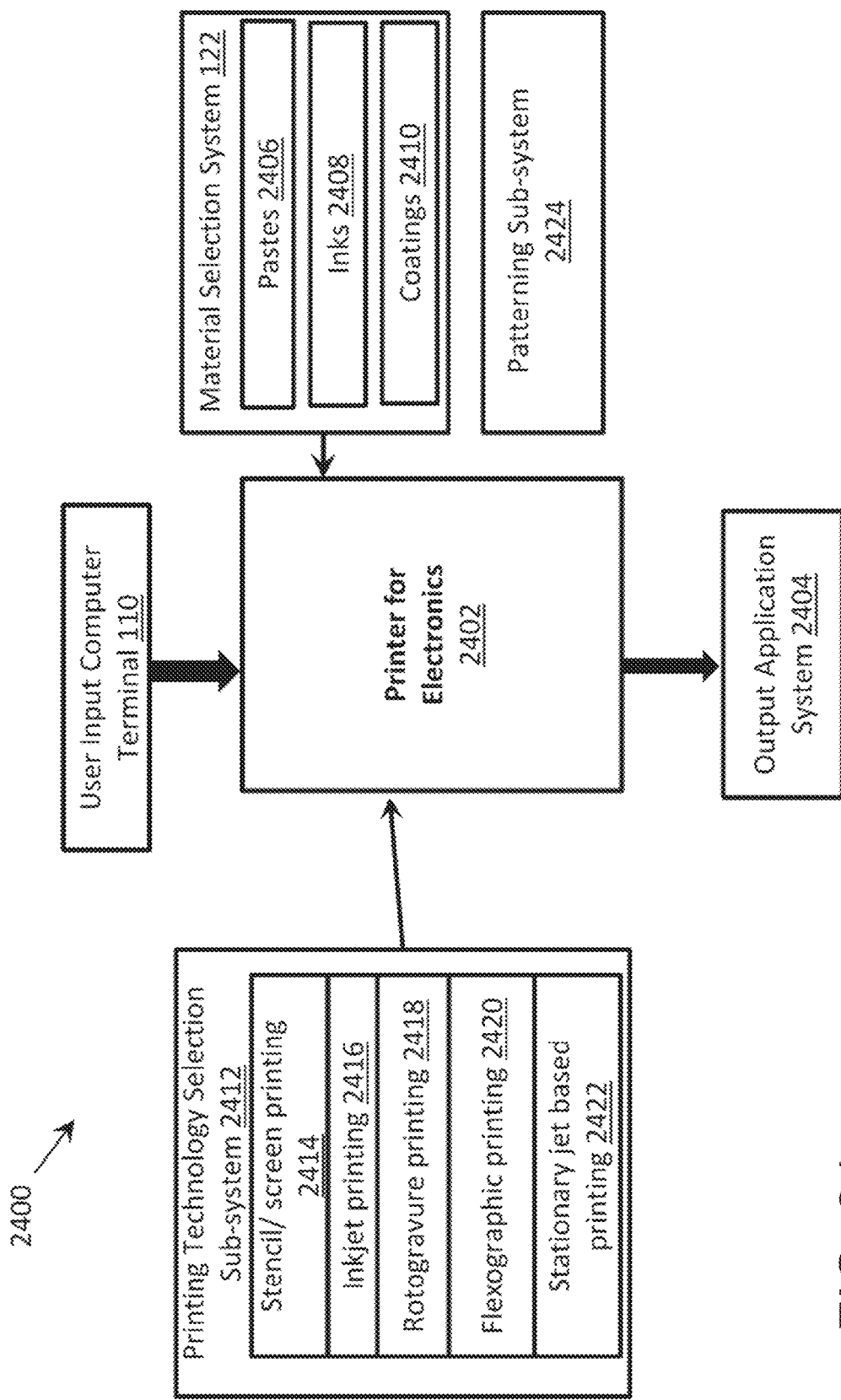
FIG. 24 is a diagrammatic view of an exemplary printed electronics system, which in embodiments may comprise a 3D printing environment with the various capabilities in accordance with embodiments of the present disclosure.

FIG. 24 illustrates an example of an electronics printing ecosystem, which in embodiments may comprise a 3D printing environment with the various capabilities disclosed throughout this disclosure. Printed electronics refers to the methods and systems for creating electrical devices on different kinds of substrate materials via printing techniques. The methods and systems of printed electronics include the use of printing processes to apply electrically conducting, semi-conducting, and also insulating materials in several superimposed layers on substrates that may themselves comprise printable materials, such as plastic films. The printing of electronics may be carried out in accordance with a pre-specified design to create a wide range of electrical devices and circuits. The electrical devices may include active or passive devices such as thin film transistors, capacitors, resistors, coils, and other such active or passive electrical devices. Printed electronics may include creating functional, optical, or electrical links on different kinds of substrates. The links may be composed of carbon-based compounds. The materials of the links may be deposited on the substrates by solution-based, vacuum-based or other processes. Printed electronics may be constructed as part of one or more other products, devices, or the like, such as according to the methods and systems disclosed throughout this disclosure.

In an example, the materials for printed electronics may be deposited on the substrate using roll-to-roll (R2R) techniques. Successful R2R deposition techniques may be associated with a plurality of processes such as requirements of materials, processes, design, and testing. The processes may be designed to ensure that all materials have adequate functionality, stability, and must be available long-term at high quantity and low price. A suitable printing process may require a high production speed, whereas production may also be possible at low temperatures and short drying times. Furthermore, only non-toxic and non-explosive materials and solvents may be used in these processes.

Figure 14:
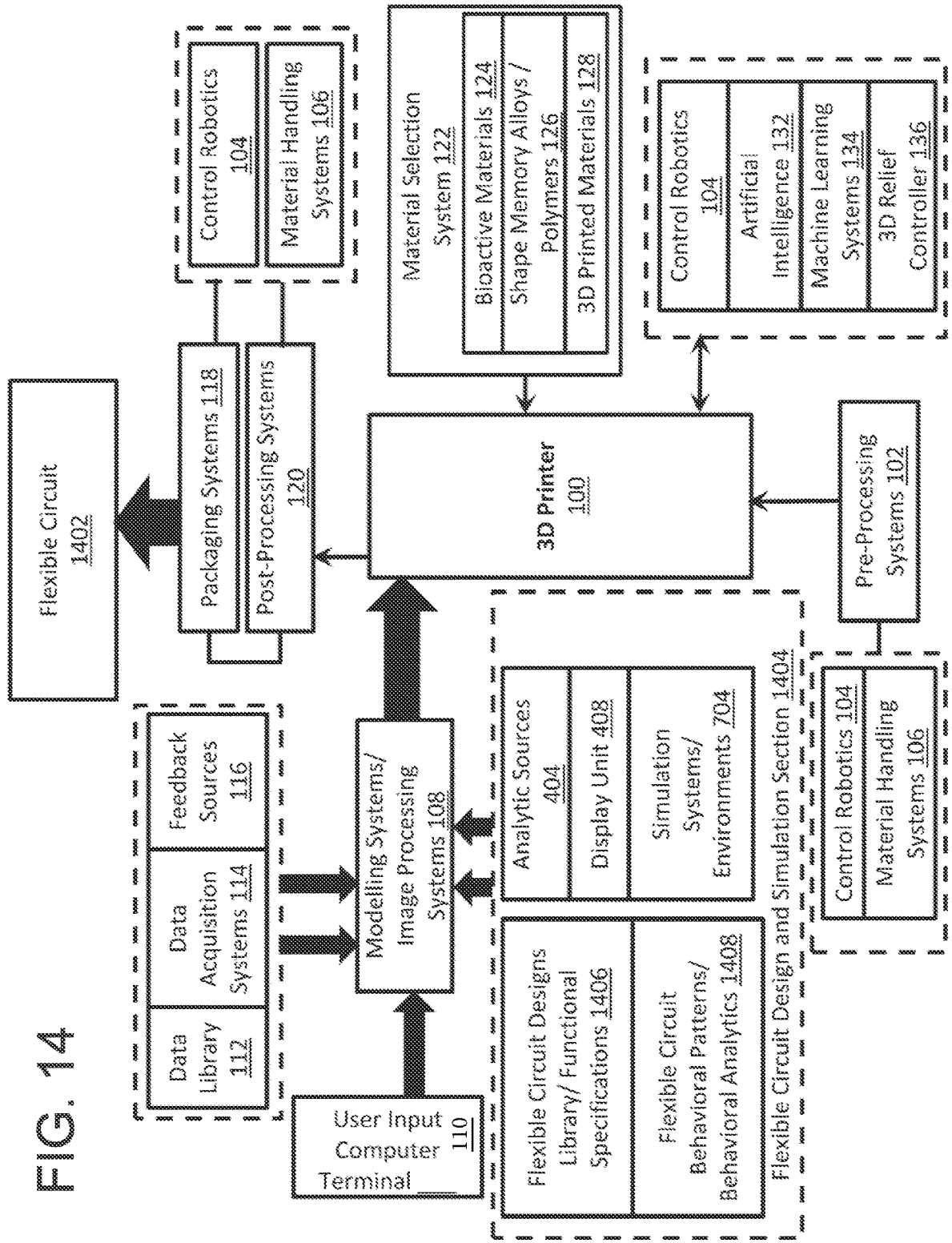
FIG. 14 is a diagrammatic view of an exemplary printing of electronics may produce a flexible circuit in accordance with embodiments of the present disclosure.

In an example, the printing of electronics may be done on flexible and optically transparent plastic films covered with highly electrically conductive coatings 2410. Printing of electronics may produce a flexible circuit 1402, as illustrated in FIG. 14. A flexible circuit 1402 may be printed using inputs from a flexible circuit designs library (or flexible circuit functional specifications) 1406. In an example, the conductive material used for these coatings 2412 may be indium-tin-oxide (ITO). However, this material has to be patterned before use. In an example, the conductive material may be composed of polyethylene terephthalate (PET).

FIG. 24 illustrates an exemplary architecture of a printed electronics system. The architecture 100 includes an input system 102, an output application system 2404, a material selection sub-system 108, a printing technology selection sub-system 2412, a patterning sub-system 2412, and printer for electronics 2402.

The input system 102 may be configured to provide commands or instructions for initiating the printing process. For example, the input system 102 may be a computer terminal 110 that may be used to give a command for starting the printing process at an industrial or commercial site. In another example, the input system may be a computer terminal 110 of a single user. The input system 102 may include a user interface that may enable a user to select a particular circuit or electrical component for printing using the printer for electronics 2402. Once the printing process is initiated, the printer for electronics 2402 may work in collaboration with other systems and sub-systems to generate an output for an output application system 2404.

The output application system 2404 may receive an output in the form of a printed film that may contain the desired electronic components, such as specified by the input terminal 102. The output application system 2404 may be used in a plurality of applications such as RFID smart labels, phone displays, e-readers, solar cells, and the like.

In an example, the output application system 2404 may receive output in the form of continuous and long thin films of plastic printed with the desired electronics. In an example, the film may be up to even two kilometers long.

The electronics components and circuits may be printed on the output film based on the selection of specific technology and inks 2408 as per the desired application. Further, the quality of the output may be dependent on various factors such as the ink drop size, distance between the various components, transparency of the film, area occupancy ratio and the like. The output electronics may be printed based on the patterns specified by the patterning sub-system 2424 and the specific technologies and materials selected using the printing technology selection sub-system 2412 and the material selection sub-system 2406. In an example, the specific technology and materials selected for printing may be dependent on the type of output application.

The different technologies that may be available for printing may be selected from the printing technology selection sub-system 2412. Some of the exemplary technologies may be illustrated as described in the sections below.

In an example, the technology for printing may include stencil printing (or screen printing) 2414 technology that may make use of emulsion screens, mesh-mount metal, or frameless metal stencils to deposit inks 2408 and pastes 2406 onto various substrates. In this technology, a screen, unique to each pattern, such as may be provided by the patterning sub-system 2424, may be first covered with a photosensitive emulsion. The emulsion may be then exposed through an image of the desired circuitry, converting the circuitry pattern to openings in the screen. The patterned screen is placed in the printer. The conductive or insulating ink is forced onto the substrate through the screen openings, replicating the pattern on the substrate.

In an example, the technology for printing may include flexographic printing 2420 that may include the use of different rolls such as fountain, anilox and plate cylinder rolls to achieve high speed, continuous roll to roll processing for products such as on-label battery testers, drug delivery patches, printed batteries, and other e-label applications. In the flexographic printing 2420 applications, the flexographic printers mount an image-patterned polymeric plate on a rotating printing plate cylinder. Other rotating cylinders transfer ink to the plate cylinder, which prints the image on the substrate. Web-fed roll to roll printing speeds may be hundreds of feet per minute.

In an example, the technology for printing may include rotogravure printing 2418 that may provide rapid printing of electronics. Rotogravure printers have a large, etched gravure cylinder carrying controlled amounts of ink to an impression cylinder that presses the flexible substrate against the gravure cylinder, transferring the pattern. High speed and high costs limit it to mega-volume products. This type of printing may be used for electronic products including medical EKG pads, high-volume RFID applications and the like.

In an example, the printing of electronics may be performed using inkjet printing 2416. The inkjet printing 2416 technology may include producing droplets of the ink contained in the fluid channel, with diameters ranging from 10 to 150 µm, which approximately corresponds to the diameter of the nozzle. In an example, the volume of the droplets may be in the pico-liter range. The inkjet printing 2416 technology may provide a non-contact process that may selectively deposit a wide range of materials onto a wide range of substrates in a drop-by-drop manner. The inkjet technology may also be useful in those applications where shop floor space requirements may be limited and the initial investment as well as the commissioning time to get an inkjet printing 2416 setup running maybe lower than most other printing technologies. Moreover, this technology may be more suitable for a wide range of production scales, from prototyping to large-scale industrial production.

The inkjet technology may be able to produce patterned thin films, which is also considered a key requirement for organic electronics. Also, inkjet technology may also be used in conjunction with other technologies to add functionalities using inkjet printing 2416 on a substrate that already has electronic structures and devices, fabricated using the other technology. Inkjet technology may provide a non-contact, mask-less and master-less technology, along with the freedom to position the printhead directly on top of any 3D coordinate of the substrate. Inkjet printing 2416 may be used for applying conductive epoxies and anisotropic conductive pastes 2406 for printed Radio-Frequency Identification (RFID) tag antenna assemblies. Printed RFID inlays incorporate operations that are already proven in semiconductor and electronics packaging.

In an example, the printing of electronics may be performed using offset lithography. In an example, the printing of electronics may be performed using jet printing. In an example, the printing of electronics may include nanoimprinting. In an example, the printing of electronics may include dip-pen nanolithography. In an example, the printing of electronics may include dry printing including organic vapor deposition. In an example, the printing of electronics may include hot embossing. In an example, the printing of electronics may include laser sintering process. In an example, the printing of electronics may include stamping or die cutting process. In an example, the printing of electronics may include any of slot, dip, or spray coating. In an example, the printing of electronics may include Roll-to-Roll (R2R) etching.

Printed electronics may employ a plurality of printing methods, such as those disclosed in the paragraphs above. Each printing method may, in turn, necessitate specific materials that may vary with viscosity, shear rate and film deposit characteristics being dependent upon the type of printing being performed. For example, stencil printing (or screen printing) 2414 may require a relatively thick ink that quickly shears and thins to a lower viscosity but recovers quickly after shear to allow for fine lines and limited slumping or bleeding. Conversely, flexographic inks 2408 may need to be even thinner to allow flow into the various rolls. Likewise, rotogravure printing 2418 may require the thinnest of all the inks 2408 to accommodate fast flow and ultra-high speed processing.

In an example, printed electronics system 100 may be capable of selecting a specific type of ink based on the type of printing method being used, from the ink selection section. In an example, the inks 2408 may be selected based on cross-functional materials that may be suitable for a plurality of printed electronic applications. For example, cross-functional materials may be used to provide conductive ink systems. In the conductive ink systems, conductive pigments may be made of silver and/or carbon. Silver has the property of being the most electrically and thermally conductive of all metals, while carbon inks 2408 may be used when resistance is a requirement for the functional part. In another example, the cross-functional materials may be used to provide dielectric inks 2408 that may be used to enable multi-layered printing and provide environmental protection of the conductive trace and help limit silver migration. In an example, the conductive inks 2408 may use silver flakes. These types of inks 2408 may be predominantly used for stencil printing 2414 (or screen printing). In an example, the conductive inks 2408 may use the silver nanoparticles. These types of inks 2408 may be predominantly used for inkjet and/or aerosol jet based printing. In an example, the conductive inks 2408 may use copper nanoparticles. These types of inks 2408 may be predominantly used for inkjet and/or aerosol jet based printing. In an example, the conductive inks 2408 may use polymers such as poly(3,4-ethylene dioxythiophene) (PEDOT) or polyaniline (PANI). These types of inks 2408 may be used for any type of printing technology.

Printed electronics may be used in applications such as capacitive display touch screens, electroluminescent lamps, membrane touch switches, printed circuit boards (PCBs), printed potentiometers, heating elements, medical biosensors, contactless smart cards, RFID labels, medical electrodes, and the like. In an example, printed electronics may be used to produce a printed battery "energy strip." Using the technology of printed electronics, a conductor, an insulator, and the thermochromic dye may be printed on the strip. In an example, printed electronics may be used to put labels on medical devices. In an example, printed electronics may be used to create interactive consumer goods packaging. In an example, printed electronics may be used to enable OLED displays and/or lighting applications. In an example, printed electronics may be used in electrochromic displays. In an example, printed electronics may be used in the manufacture of solar cells. In an example, printed electronics may be used in e-book readers, to enable the display.

Printed electronics may provide lightweight, flexible, thin, and low-cost electronic devices. Thinner dimensions of the thin films of printed electronics may enable the films to fit into a kind of electronics application where space is a constraint.

Figure 25:
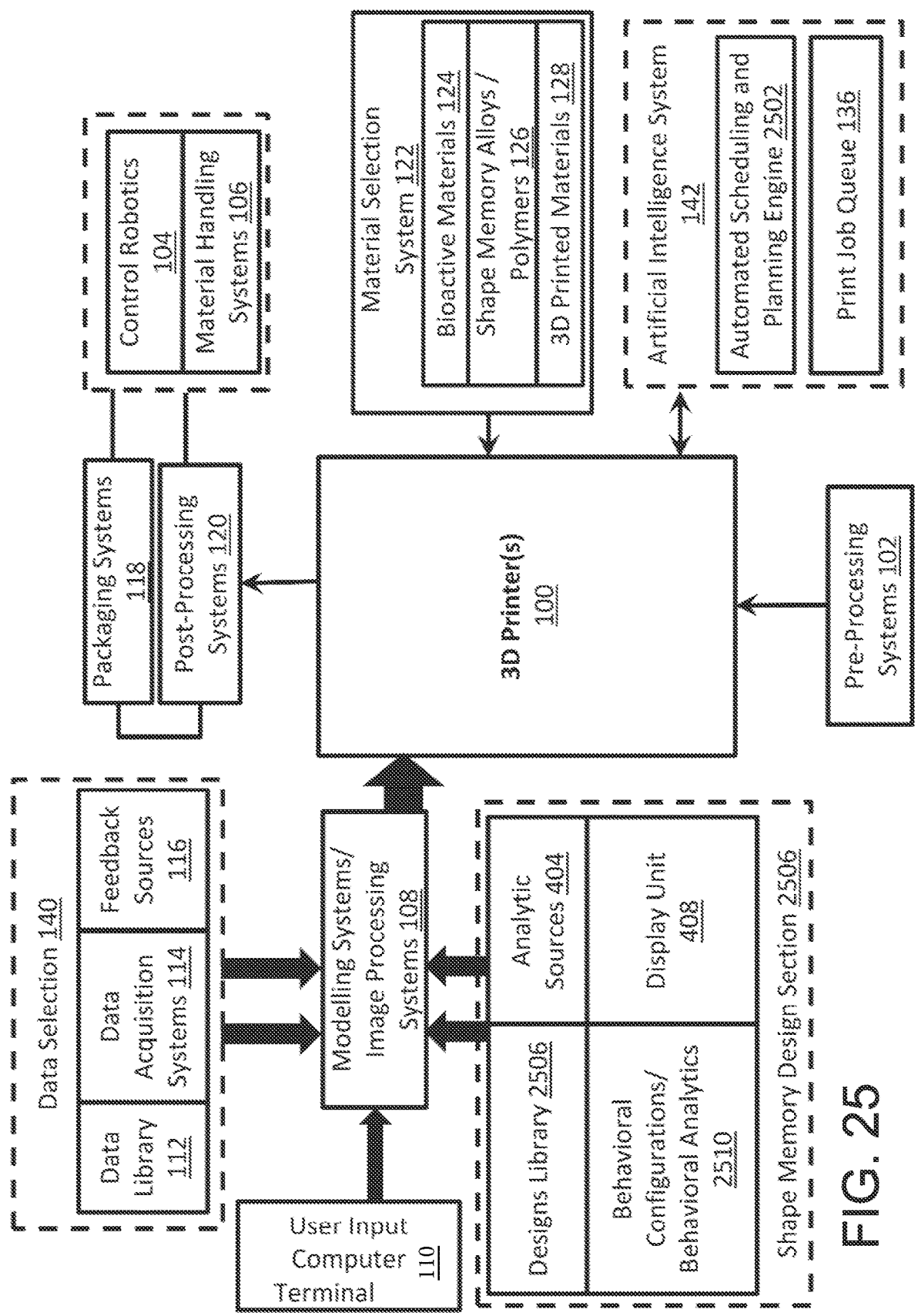
FIG. 25 is a diagrammatic view of an example of scheduling 3D print jobs using a priority-based print job queue, which in embodiments may comprise a 3D printing environment with the various capabilities in accordance with embodiments of the present disclosure.

As discussed above, in embodiments the artificial intelligence systems 132 may include an automated scheduling and planning engine (or "scheduling engine"). FIG. 25 illustrates an example printing environment that includes a scheduling engine 2502. In embodiments, the scheduling engine 2502 is configured to maintain a print job queue 2504. A print job queue 2504 may define an order at which various print jobs are executed and/or a time at which each respective print job is scheduled. In embodiments, the scheduling engine 2502 determines a priority score for each respective print job and orders the print job queue 2504 based on the respective priority scores. In embodiments, the scheduling engine 2502 may calculate a priority score based on one or more print job attributes. The print job attributes may include one or more of a print job completion time (e.g., how much time is needed to fabricate the item to be pre-processed, printed, and/or post-processed), a printing time (e.g., an amount of time needed by the printer to print the item), a requested pickup time (e.g., when does the print job need to be completed by), a loyalty of the customer requesting the print job, a price paid by the customer (e.g., higher paying customers receive higher priority), a distance of the customer from the pickup location, and the like. The completion time and/or the printing time of an item may be stored in the design library 2508, and in particular in a record corresponding to the item.

The set of factors that are used to calculate a priority score may vary depending on the intended use of the 3D printer 100. For example, for printing food items (e.g., FIGS. 6, 22, and 23), the scheduling engine 2502 may calculate a priority score of a food print job based on the completion time and/or print time, and a requested pickup time and/or a distance of the customer from the pickup location. In these embodiments, the scoring function implemented by the scheduling engine 2502 may seek to minimize customer wait time, while also minimizing the amount of time a printed food item waits for a customer pick up time. Furthermore, the priority score may be further based on the loyalty of a customer. For example, customers having loyalty status may be given a priority score boost. In these embodiments, the scheduling engine may calculate a priority score to minimize customer wait time at the pickup location for loyal customers, while also minimizing the amount of time a printed food item waits for a customer to pick up the item. In some embodiments, the priority score may be further based on the properties of food items. For example, items that are better served warmer or cooler than room temperature are scheduled so as to minimize the amount of time the item waits to be picked up, while items that can be served at room temperature can be prioritized to be printed when there is bandwidth at the 3D printer 100.

In another example, the scheduling engine 2502 schedules industrial print jobs, such as fabrication of synthetic wood items, auto parts, custom construction parts, and the like. In these embodiments, the scheduling engine 2502 may schedule these print jobs based on the print time or completion time, the requested pickup time, the price paid by the customer, and loyalty of the customer. In these embodiments, the scoring function may seek to minimize customer wait time. For example, the scoring function may be implemented to rank print jobs that need to be completed sooner higher than print jobs that need to be completed later, while scheduling print jobs that can be completed more quickly in between longer print jobs when there is bandwidth to fit in between two higher priority print jobs. In this way, the printer may be used more efficiently.

In another example, the scheduling engine 2502 schedules biomedical related print jobs (e.g., the examples of FIGS. 7, 8, 11, and 19). For example, the 3D printer may be configured to print surgical tools or attachments or medical devices that are implanted in a patient (e.g., knee replacements, hip replacements, stents, medical grade rods and screws, and the like). In these embodiments, the scheduling engine 2502 may be configured to schedule print jobs based on the print time or completion time and the requested pickup time. In these embodiments, the scoring function may be implemented to ensure that surgical procedures or other healthcare related procedures are not delayed.

The scoring functions implemented by the scheduling engines 2502 discussed above can be derived in any suitable manner. In embodiments, the machine-learned scoring model may be a regression-based model. In some of these embodiments, a machine learning system 134 trains a machine-learned scoring model that scores each print job based on training (or outcome) data relating to previously performed printing jobs and/or hypothetical printing jobs. In some embodiments, the training data may be structured in feature vectors corresponding to each respective previous or hypothetical print job, where each feature vector contains values corresponding to each respective print job attribute used to generate a priority score. Each instance of training data may further include a priority score assigned to each of the previous print job or hypothetical print job. The machine learning system 134 may generate a regression-based scoring model based on the training data. The machine-learned scoring model may then be used by a scheduling engine 2502 to generate priority scores for each print job that has been requested.

In some embodiments, the scheduling engine 2502 determines a priority score of each print job using a rules-based approach. In these embodiments, the rules may define a hierarchy of factors on which a respective print job is prioritized. In these embodiments, the scheduling engine 2502 may process each print job to determine an amount of time needed to complete the printing process (e.g., pre-processing time plus printing time plus post-processing time) and an expected delivery time (e.g., when does the requestor need the item to be printed). The amount of time needed to complete the printing process of an item may be defined in the design record (or similar data structure) corresponding to the item. The expected delivery time may be explicitly stated in a request (e.g., pickup at 5:15) or may be derived based on other values (e.g., requestor or delivery service is fifteen miles away and is en route to pick up the item and, therefore, is 25 minutes away). The scheduling engine 2502 may then determine a lead time for each print job based on the delta between the time to complete the printing process and the expected delivery time. A first rule may state that the print jobs may be initially ranked according to the lead time. Another rule may define a rule for adjusting the ranking based on customer loyalty. For example, when to print jobs have similar lead times, the print job corresponding to a customer with loyalty status is ranked ahead of the print job corresponding to a customer with no loyalty status or less loyalty status. Another rule may aim to minimize storage time. For example, if the total lead time of a print job is relatively high (e.g., more than one hour for a food item or more than two days for a surgical tool), the rule may instruct the scheduling engine to assign a relatively lower priority score to the print job, so as to move the print job towards the end of the queue and to minimize the amount of time the printed item sits around. This may be useful when the printed items are subject to cooling or melting (e.g., warm or frozen food items) or if storage costs associated with the items is a consideration (e.g., items that take up lots of space or require certain storing conditions). The scheduling engine 2502 may use additional or alternative rules to determine the priority score of each print job.

In embodiments, the scheduling engine 2502 may control one or more 3D printers 100 based on the print job queue. In operation, the scheduling engine 2502 may determine when a print job is close to completion and, therefore, freeing up printing bandwidth. The scheduling engine 2502 may then assign a print job to the 3D printer having bandwidth based on the ordering of the print job queue. The scheduling engine 2502 may periodically recalculate the priority score of each requested print job. For example, the scheduling engine 2502 may recalculate the priority score of each requested print job each time a new print job request is received. Additionally, or alternatively, the scheduling engine 2502 may recalculate the priority score of each requested print job each time a 3D printer 100 finishes a print job (or nears completion).

Figure 26:
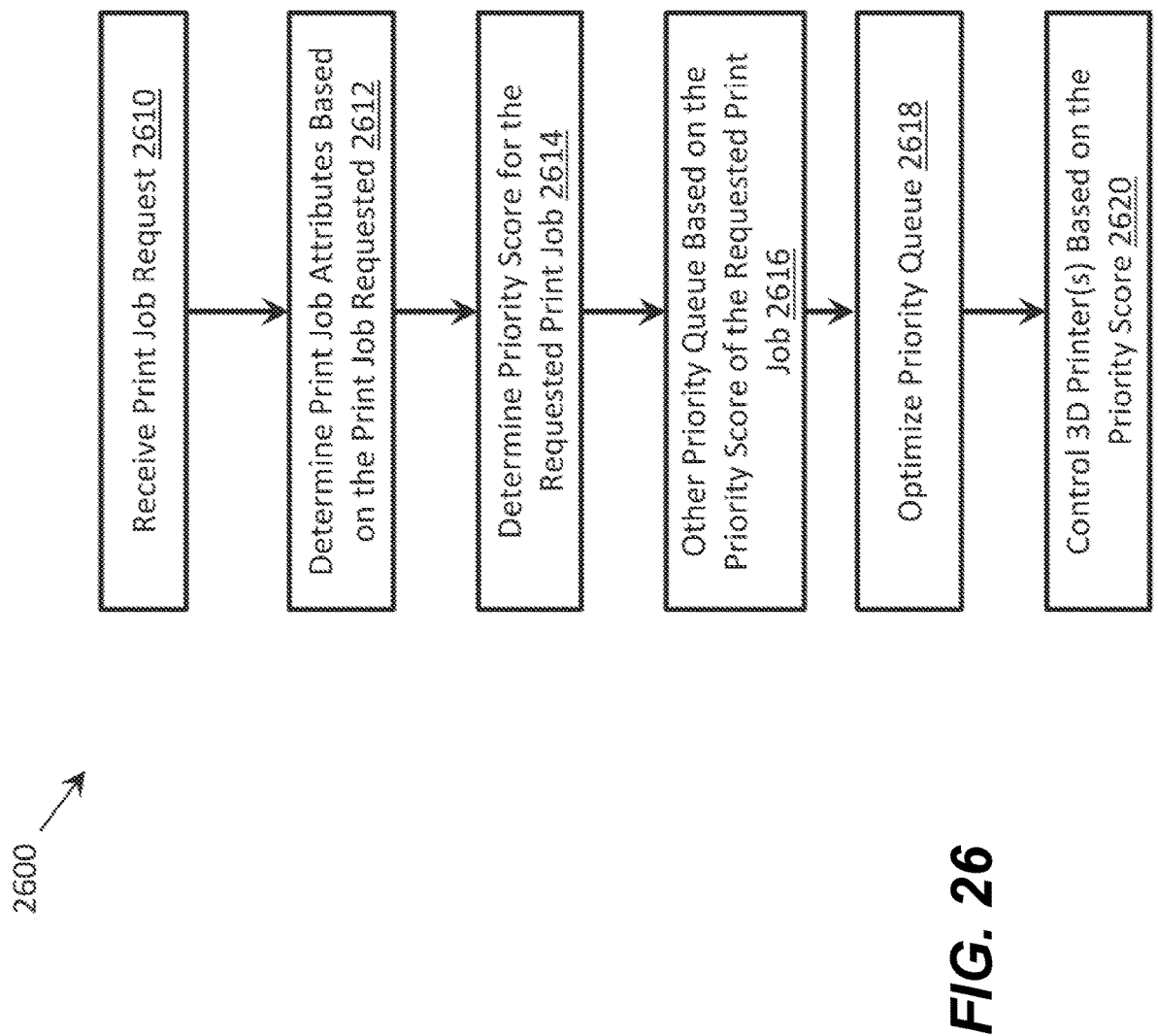
FIG. 26 is a flowchart illustrating an example method for scheduling a requested print job in accordance with embodiments of the present disclosure.

FIG. 26 illustrates an example method 2600 for scheduling print jobs. In embodiments, the method 2600 is executed by the scheduling engine 2502. The method may be executed by any other suitable component. In embodiments, the method is implemented as a set of computer readable instructions that are executed by a system of one or more processors.

At 2610, the scheduling engine 2502 receives a print job request. The print job request may indicate one or more of a type of item to be printed, a model of an item to be printed, a requested delivery time (e.g., when the item is to be picked up or delivered), a customer identifier (if being ordered by a customer), a location of the requestor, and/or other suitable information relevant to the print job.

At 2612, the scheduling engine 2502 determines one or more print job attributes of the requested print job. The print job attributes may be values corresponding to the factors that are used to determine a priority score of a requested print job. In embodiments, the scheduling engine 2502 may determine a completion time or print time of a print job based on the type of item and/or the model of the item. In embodiments, the scheduling engine 2502 may determine a lead time of the print job based on the completion time or print time and the requested delivery time. In embodiments, the scheduling engine 2502 may determine the requested delivery time based on a location of the requestor (e.g., how long it will take the requestor to arrive the pickup location). These embodiments may be where a consumer orders an on-demand item to be printed, such as a food item. The scheduling engine 2502 may further determine a loyalty of a customer based on a customer profile indicated by a customer identifier.

At 2614, the scheduling engine 2502 may generate a priority score for the requested print job based on the print job attributes of the requested print job. In embodiments, the scheduling engine 2502 may input the attributes of the requested print job into a machine-learned scoring model. In these embodiments, the scoring model 2502 may output a priority score based on the printed attributes of the requested print job. In embodiments, the scheduling engine 2502 generates the priority score using a rules-based approach. In these embodiments, the scheduling engine 2502 may utilize the print job attributes to determine a priority score relative to the other requested print jobs based on one or more rules defining a manner by which print jobs are ranked or otherwise scored. In some embodiments, the scheduling engine 2502 recalculates the priority scores of other previously scored print jobs, so as to maintain "fresh" priority scores.

At 2616, the scheduling engine 2502 orders a print job queue 2504 based on the respective priority scores of each print job. In embodiments, the scheduling engine 2502 may order the print job queue such that print jobs having higher priorities are closer to the head of the queue than print jobs having relatively lower priorities.

At 2618, the scheduling engine 2502 (optionally) optimizes the print job queue 2504 based on printer bandwidth and the completion times of each item. In these embodiments, the scheduling engine 2502 may optimize the usage of a collection of 3D printers 100 by inserting lower priority print jobs ahead of higher priority print jobs if the higher priority print jobs may be completed by the delivery time even after the lower priority print job is processed. This may allow the scheduling engine 2502 to complete more print jobs over a period of time without disrupting the delivery times of print jobs.

At 2620, the scheduling engine 2502 controls one or more 3D printers 100 based on the print job queue. The scheduling engine 2502 may assign a print job to a 3D printer 100 upon a determination that a 3D printer 100 has completed a task or is near completion on the task. The scheduling engine 2502 may remove a print job from the head of the print job queue and may initiate the print job. Initiating the print job may include retrieving all relevant data relating to the print job, including a model of the item to be printed and any data relating to the materials to be used. In embodiments, the scheduling engine 2502 may provide the print job to the materials selection system 122, which determines the materials to be used in the print job. In embodiments, the scheduling engine 2502 may initiate pre-processing of the print job by passing the print job to a pre-processing system 102, which may begin the pre-processing of the print job.

It is noted that the scheduling engine 2502 may execute the foregoing method 2600 iteratively, as more and more print jobs are executed and assigned. In executing the method 2600, the use of the 3D printers 100 may be optimized, so as to increase the throughput of the 3D printers while delivering printed items in a timely manner. Furthermore, the foregoing method 2600 may be applied to other similar applications, such as robotic food preparation.

Detailed embodiments of the present disclosure are disclosed herein; however, it is to be understood that the various disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law. The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, dais coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere near be implemented on a cellular network having multiple cells. The cellular network may either be frequency division multiple access (TDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, react/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above-described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A three-dimensional (3D) printing system comprising:
  a non-transitory computer readable medium storing computer readable instructions; and a processing system having one or more processors that execute the computer readable instructions, wherein the computer readable instructions cause the processing system to:
- receive a print job request corresponding to a requested print job, the print job request indicating an item to be 3D printed;
- determine a plurality of print job attributes corresponding to the requested print job, including: (i) determining a first amount of time to complete the requested print job once printing begins; and (ii) determining a second amount of time corresponding to an expected delivery time when the item is to be provided to a requestor, wherein the plurality of print job attributes includes the first amount of time and the second amount of time;
- determine a priority score of the requested print job based on the plurality of print job attributes, wherein the priority score is further based on a third amount of time corresponding to a storage time between when the requested print job is completed and the expected delivery time;
- order a 3D print job queue based on the priority score of the requested print job and other priority scores of one or more other print jobs stored in the 3D print job queue; and
- initiate a new 3D print job by a 3D printer of one or more 3D printers based on the 3D print job queue.

2. The 3D printing system of claim 1, further comprising the one or more 3D printers.

3. The 3D printing system of claim 2, wherein the one or more 3D printers print industrial items.

4. The 3D printing system of claim 2, wherein the one or more 3D printers print food items.

5. The 3D printing system of claim 2, wherein the one or more 3D printers print biomedical items.

6. The 3D printing system of claim 1, wherein determining a priority score of the requested print job based on the plurality of print job attributes includes inputting the plurality of print job attributes to a scoring model, wherein the scoring model outputs a priority score of the requested print jobs based on the plurality of print job attributes.

7. The 3D printing system of claim 1, wherein the priority score of the requested print job is determined based on a rules-based approach.

8. The 3D printing system of claim 1, wherein the plurality of print job attributes includes a location of a requestor, and wherein determining the second amount of time is based on the distance of the requestor from a location of the one or more 3D printers.

9. The 3D printing system of claim 1, wherein the second amount of time is indicated by a requested pickup time received in the request.

10. The 3D printing system of claim 1, wherein determining the first amount of time includes:
- retrieving a design record from a design library corresponding to the item to be 3D printed;
- determining a completion time of the item to be 3D printed from the design record; and
- determining the first amount of time based on the completion time.

11. The 3D printing system of claim 10, wherein the completion time indicates an amount of time needed to 3D print the item.

12. The 3D printing system of claim 10, wherein the completion time indicates an amount of time needed to pre-process the requested print job, 3D print the item, and post-process the item.

13. The 3D printing system of claim 1, wherein determining the first amount of time includes:
- receiving a 3D model of the item to be printed;
- estimating a completion time based on the model; and
- determining the first amount of time based on the completion time.

14. The 3D printing system of claim 1, wherein the print job attributes of the requested print job include a loyalty attribute corresponding to a requestor of the print job.

15. The 3D printing system of claim 1, wherein the print job attributes of the requested print job include a price attribute indicating a price paid to have the item 3D printed.

16. A method for controlling a three-dimensional (3D) printing system comprising:
- receiving, by a processing system having one or more processors, a print job request corresponding to a requested print job, the print job request indicating an item to be 3D printed;
- determining, by the processing system, a plurality of print job attributes corresponding to the requested print job, including:
  - determining a first amount of time to complete the requested print job once printing begins; and
  - determining a second amount of time corresponding to an expected delivery time when the item is to be provided to a requestor
  - wherein the plurality of print job attributes includes the first amount of time and the second amount of time;
- determining, by the processing system, a priority score of the requested print job based on the plurality of print job attributes, wherein the priority score is further based on a third amount of time corresponding to a storage time between when the requested print job is completed and the expected delivery time;
- ordering, by the processing system, a 3D print job queue based on the priority score of the requested print job and other priority scores of one or more other print jobs stored in the 3D print job queue; and
- initiating, by the processing system, a new 3D print job by a 3D printer of one or more 3D printers based on the 3D print job queue.

17. The method of claim 16, wherein the one or more 3D printers print industrial items.

18. The method of claim 16, wherein the one or more 3D printers print food items.

19. The method of claim 16, wherein the one or more 3D printers print biomedical items.

20. The method of claim 16, wherein determining a priority score of the requested print job based on the plurality of print job attributes includes inputting the plurality of print job attributes to a scoring model, wherein the scoring model outputs a priority score of the requested print jobs based on the plurality of print job attributes.

21. The method of claim 16, wherein the priority score of the requested print job is determined based on a rules-based approach.

22. The method of claim 16, wherein the plurality of print job attributes includes a location of a requestor, and wherein determining the second amount of time is based on the distance of the requestor from a location of the one or more 3D printers.

23. The method of claim 16, wherein the second amount of time is indicated by a requested pickup time received in the request.

24. The method of claim 16, wherein determining the first amount of time includes:
retrieving a design record from a design library corresponding to the item to be 3D printed;
determining a completion time of the item to be 3D printed from the design record; and
determining the first amount of time based on the completion time.

25. The method of claim 24, wherein the completion time indicates an amount of time needed to 3D print the item.

26. The method of claim 24, wherein the completion time indicates an amount of time needed to pre-process the requested print job, 3D print the item, and post-process the item.

27. The method of claim 16, wherein determining the first amount of time includes:
receiving a 3D model of the item to be printed;
estimating a completion time based on the model; and
determining the first amount of time based on the completion time.

28. The method of claim 16, wherein the print job attributes of the requested print job include a loyalty attribute corresponding to a requestor of the print job.

29. The method of claim 16, wherein the print job attributes of the requested print job include a price attribute indicating a price paid to have the item 3D printed.

30. A non-transitory computer readable storage medium having a plurality of instructions stored thereon, which, when executed by one or more processors associated with a three-dimensional (3D) printing system, cause the one or more processors to perform operations comprising:
receiving a print job request corresponding to a requested print job, the print job request indicating an item to be 3D printed;
determining a plurality of print job attributes corresponding to the requested print job, including: (i) determining a first amount of time to complete the requested print job once printing begins; and (ii) determining a second amount of time corresponding to an expected delivery time when the item is to be provided to a requestor, wherein the plurality of print job attributes includes the first amount of time and the second amount of time;
determining a priority score of the requested print job based on the plurality of print job attributes, wherein the priority score is further based on a third amount of time corresponding to a storage time between when the requested print job is completed and the expected delivery time;
ordering a 3D print job queue based on the priority score of the requested print job and other priority scores of one or more other print jobs stored in the 3D print job queue; and
initiating a new 3D print job by a 3D printer of one or more 3D printers based on the 3D print job queue.

31. The computer readable storage medium of claim 30, further comprising the one or more 3D printers.

32. The computer readable storage medium of claim 31, wherein the one or more 3D printers print industrial items.

33. The computer readable storage medium of claim 30, wherein determining the priority score of the requested print job based on the plurality of print job attributes includes inputting the plurality of print job attributes to a scoring model, wherein the scoring model outputs a priority score of the requested print jobs based on the plurality of print job attributes.

34. The computer readable storage medium of claim 30, wherein the priority score of the requested print job is determined based on a rules-based approach.

35. The computer readable storage medium of claim 30, wherein the plurality of print job attributes includes a location of a requestor, and wherein determining the second amount of time is based on the distance of the requestor from a location of the one or more 3D printers.

36. The computer readable storage medium of claim 30, wherein the second amount of time is indicated by a requested pickup time received in the request.

37. The computer readable storage medium of claim 30, wherein determining the first amount of time includes:
retrieving a design record from a design library corresponding to the item to be 3D printed;
determining a completion time of the item to be 3D printed from the design record; and
determining the first amount of time based on the completion time.

38. The computer readable storage medium of claim 37, wherein the completion time indicates an amount of time needed to 3D print the item.

39. The computer readable storage medium of claim 30, wherein determining the first amount of time includes:
receiving a 3D model of the item to be printed;
estimating a completion time based on the model; and
determining the first amount of time based on the completion time.

40. The computer readable storage medium of claim 30, wherein the print job attributes of the requested print job include a loyalty attribute corresponding to a requestor of the print job.

* * * * *